(12) United States Patent
Matsui et al.

(10) Patent No.: US 7,852,584 B2
(45) Date of Patent: *Dec. 14, 2010

(54) HEAD IC, READ CIRCUIT, AND MEDIA STORAGE DEVICE

(75) Inventors: Jyunko Matsui, Kawasaki (JP);
Yasuhiko Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 383 days.

This patent is subject to a terminal disclaimer.

(21) Appl. No.: 12/004,797

(22) Filed: Dec. 21, 2007

(65) Prior Publication Data

US 2008/0100944 A1 May 1, 2008

Related U.S. Application Data

(63) Continuation-in-part of application No. 11/881,259, filed on Jul. 25, 2007, now abandoned.

(30) Foreign Application Priority Data

Sep. 20, 2006 (JP) ............................ 2006-254189
Sep. 12, 2007 (JP) ............................ 2007-236899

(51) Int. Cl.
*G11B 5/09* (2006.01)
(52) U.S. Cl. ........................................ 360/46; 360/67
(58) Field of Classification Search ................. None
See application file for complete search history.

(56) References Cited

U.S. PATENT DOCUMENTS

| 5,539,779 | A | * | 7/1996 | Nagahori ................... 375/317 |
| 5,576,906 | A | | 11/1996 | Fisher et al. |
| 5,831,781 | A | | 11/1998 | Okamura |
| 5,862,005 | A | | 1/1999 | Leis et al. |
| 5,955,921 | A | * | 9/1999 | Ide et al. ..................... 330/254 |
| 6,018,554 | A | | 1/2000 | Glover |
| 6,452,990 | B1 | | 9/2002 | Leis et al. |
| 6,618,215 | B2 | * | 9/2003 | Fung et al. .................... 360/31 |
| 2008/0100944 | A1 | | 5/2008 | Matsui et al. |
| 2008/0123212 | A1 | | 5/2008 | Amemiya |
| 2009/0141386 | A1 | | 6/2009 | Miura |

(Continued)

FOREIGN PATENT DOCUMENTS

JP          53-27011          3/1978

(Continued)

*Primary Examiner*—Jason C Olson
(74) *Attorney, Agent, or Firm*—Greer, Burns & Crain, Ltd.

(57) ABSTRACT

A head IC adjusts an amplitude level of head read signals with regard to scattering in head output characteristics, so as to conform to the input dynamic range of the read channel AGC. An AGC amplifier is provided in a head IC connected to a read channel, and the feedback response speed of the AGC circuit of the head IC is set to be substantially slower than the feedback response speed of the AGC circuit of the read channel. Within the head IC, the amplitude of signals from the head is automatically adjusted, enabling adjustment of the input signal level to the input dynamic range of the AGC amplifier of the read channel. The AGC circuit of the head IC has no effect on the faster AGC operation of the AGC circuit of the read channel.

23 Claims, 14 Drawing Sheets

U.S. PATENT DOCUMENTS

2009/0147408 A1  6/2009  Yamasaki

FOREIGN PATENT DOCUMENTS

| JP | 63-237205 | 10/1988 |
|---|---|---|
| JP | 64-062806 | 3/1989 |
| JP | 05-166198 | 7/1993 |
| JP | 07-0006487 | 1/1995 |
| JP | 08-097349 | 4/1996 |
| JP | 9-139040 | 5/1997 |
| JP | 10-021647 | 1/1998 |
| JP | 10-507027 | 7/1998 |
| JP | 2000-187804 | 7/2000 |
| JP | 2001-093221 | 4/2001 |
| JP | 3926391 | 6/2007 |
| WO | WO 97-16010 | 5/1997 |

* cited by examiner

HEAD IC, READ CIRCUIT, AND MEDIA STORAGE DEVICE

CROSS-REFERENCE TO RELATED APPLICATIONS

This application is a continuation-in-part of prior application Ser. No. 11/881,259, Jul. 25, 2007. This application is based upon and claims the benefit of priority from the prior Japanese Patent Application No. 2006-254189, filed on Sep. 20, 2006, and the prior Japanese Patent Application No. 2007-236899, filed on Sep. 12, 2007, the entire contents of which are incorporated herein by reference.

BACKGROUND OF THE INVENTION

1. Field of the Invention

The present invention relates to a head IC which adjusts an output level of read signals of a head, a read circuit, and a media storage device, and in particular relates to a head IC which adjusts the read signals of the head with different output levels to a prescribed level, a read circuit, and a media storage device.

2. Description of the Related Art

In a media storage device, such as for example a magnetic disk device, a head reads data from media. With increases in track densities in recent years, heads have come to be supplied with a high sensitivity of detection of magnetic flux in medium, and MR (magneto-resistance) elements are used in read heads. On the other hand, as elements with still higher detection sensitivity, application of TuMR (or TMR) elements which utilize the tunneling effect is being studied.

In this way, the output levels of each read elements are not constant, and moreover the output level varies depending on changes in element characteristics due to temperature fluctuations as well as fluctuations in flying height of the head. Hence a circuit is necessary to adjust the read element output level prior to demodulation of data.

FIG. 14 shows the configuration of a media storage device of the prior art, and FIG. 15 is a block diagram of a read circuit of the prior art. As shown in FIG. 14, magnetic heads 202*a* and 202*b* which read data on media (a magnetic disk) 210 are provided at the tip of an actuator 200.

The actuator 200 rotates about a rotation axis 204, and positions the magnetic heads 202*a*, 202*b* at the desired tracks on the magnetic disk 210. The magnetic heads 202*a*, 202*b* are connected to the head IC 220 provided on the actuator 200, and the head IC 220 is connected to a control circuit 230 outside the actuator 200.

Because of the long distance from the magnetic heads 202*a*, 202*b* to the control circuit 230, there are changes in the levels of signals of the magnetic heads 202*a* and 202*b*, and noise is intermingled. In order to prevent such a level change, a head IC 220 is provided between the magnetic heads 202*a*, 202*b* and the control circuit 230, to adjust the signal level. Another object of this head IC 220 is to collect numerous signal lines between the magnetic heads and the control circuit, to facilitate wiring. For example, the control circuit 230 and head IC 220 are connected via a serial interface, and the head IC 220 and each of the magnetic heads 202*a*, 202*b* are connected by individual signal lines.

FIG. 15 shows in detail the read circuit of FIG. 14. As shown in FIG. 15, a variable-gain amplifier (preamp) 220-1 is provided in the head IC 220 connected to the read element 202-1 of the magnetic head 202*a* (or 202*b*), and the output from the read element 202 is amplified at the preset gain. The variable-gain amplifier 202-1 sets the gain for each head.

A read channel 230-1 is provided in the control circuit 230 connected to the head IC 220 and an AGC (Automatic Gain Control) amplifier 230-2 provided in the read channel 230-1 receives the output from the variable-gain amplifier 220-1 of the head IC 220.

The AGC amplifier 230-2 has a differential amplifier 230-3 and an AGC circuit 230-4. The AGC circuit 230-4 compares the output value of the differential amplifier 230-3 with a reference output value, feeds back the comparison result, adjusts the gain of the differential amplifier 230-3, and adjusts the output level of the differential amplifier 230-3 to the reference level (see for example Japanese Patent Laid-open No. 10-021647).

In this AGC circuit 230-4, high-speed feedback coefficients (frequency, gain change amount) are set so as to follow changes within one sector of a track of the magnetic disk 210, and the signal level within one sector is rendered uniform.

In the technology of the prior art, such fluctuations in output level due to fluctuations in the characteristics of the element itself or to fluctuations in the flying height or other ambient conditions have been adjusted using the AGC amplifier of the read channel.

However, due to increases in recording densities in recent years, there have been demands for TuMR elements with higher detection sensitivity than other read elements. Such high-sensitivity read elements are thought to have detection sensitivities roughly ten times that of MR elements, but scattering in the signal output level is proportionately greater. Further, because of the high detection sensitivity, fluctuations in signal level due to temperature fluctuations and fluctuations in flying height of the head are also large.

Such large fluctuations in signal level may complicate the task of adjustment using the AGC amplifier of the read channel.

Moreover, increases in recording densities have led to higher circuit frequencies, faster AGC amps for read channels are being sought, and the AGC input dynamic range is narrowing. As a result, it has become difficult to adjust for level fluctuations by modifying the AGC amplifier of the read channel.

Thus as recording densities rise, there have been limits to the ability to adjust signal levels through level adjustment by the read channel AGC when using highly sensitive read elements, and when using circuits with fast operating frequencies.

SUMMARY OF THE INVENTION

Hence an object of the invention is to provide a head IC, read circuit, and media storage device to perform dynamic adjustment to cope with head output fluctuation.

A further object of the invention is to provide a head IC, read circuit, and media storage device to perform dynamic adjustment to cope with head output fluctuation even when there is large scattering in the head output level.

Still a further object of the invention is to provide a head IC, read circuit, and media storage device to perform dynamic adjustment to cope with head output fluctuation even when the input dynamic range of the read channel AGC circuit is narrow.

Still a further object of the invention is to provide a head IC, read circuit, and media storage device to automatically adjust for head output fluctuations, to realize high recording densities.

In order to attain these objects, a head IC of the invention is a head IC which adjusts the amplitude level of head read signals and outputs the result to a read channel having an AGC amplifier, and has a differential amplifier, which amplifies read signals at a preset gain, and an AGC circuit which takes the difference between one of an input and an output amplitude level of the differential amplifier and a reference level, and automatically controls the gain of the differential amplifier according to a prescribed pull-in characteristic; the output of the AGC circuit is input to said AGC amplifier of the read channel.

Further, a read circuit of the invention has a head IC which adjusts the amplitude level of read signals from the head and a read channel, which has an AGC amplifier, connected to the head IC; the head IC has a differential amplifier, which amplifies the read signal at a preset gain, and an AGC circuit which takes the difference between the output amplitude level of the differential amplifier and a reference level and automatically controls the gain of the differential amplifier according to a prescribed pull-in characteristic; and the output of the AGC circuit is input to said AGC amplifier of the read channel.

Further, a media storage device of the invention has a head which reads media, a head IC which adjusts the amplitude level of read signals from the head, and a read channel connected to the head IC and having an AGC amplifier; the head IC has a differential amplifier which amplifies read signals at a preset gain and an AGC circuit which takes the difference between the output amplitude level of the differential amplifier and a reference level, and automatically controls the gain of the differential amplifier according to a prescribed pull-in characteristic; and the output of the AGC circuit is input to said AGC amplifier of the read channel.

In this invention, it is preferable that a pull-in characteristic of the AGC circuit is set to be slower than the pull-in characteristic of the AGC amplifier of the read channel.

In this invention, it is preferable that memory to store an initial value of the gain, and a sequencer circuit to set the differential amplifier to the initial value of the gain in the memory at the time of initiation of pull-in of the AGC circuit, be provided.

In this invention, it is preferable that the sequencer circuit updates the initial value of the gain in the memory with the gain set in the differential amplifier of the AGC circuit, in response to the end of reading by the head.

In this invention, it is preferable that the sequencer circuit sets the pull-in characteristic of the AGC circuit to be fast at the time of startup of the AGC circuit, and instructs that the gain of the read channel AGC amplifier be fixed, and in response to the end of AGC circuit pull-in, sets the pull-in characteristic of the AGC circuit to be slower than the pull-in characteristic of the read channel AGC amplifier.

In this invention, it is preferable that a detection circuit be further provided which estimates the output level according to the resistance value of the head, calculates an initial value, and writes the initial value to the memory.

In this invention, it is preferable that the AGC circuit have a gain error computation portion which computes the difference between the output amplitude level of the differential amplifier and the reference level, a low-pass filter which cuts off high-frequency components in the difference output, and a gain multiplier, which multiplies the output of the low-pass filter by a prescribed feedback gain, to control the gain of the differential amplifier.

In this invention, it is preferable that a head switching section be provided to connect the differential amplifier to any one of a plurality of heads according to a head switching signal, that the gain initial values of the plurality of heads be stored in the memory, and that the sequencer circuit sets the gain initial value corresponding to the connected head in the memory to the differential amplifier at the time of initiation of AGC circuit pull-in.

An AGC amplifier is provided in the head IC, so that the amplitude from the head can be automatically adjusted within the head IC, and the signal level can be adjusted to fall within the input dynamic range of the read channel AGC amplifier.

When two AGC circuits operate simultaneously, there is the danger of occurrence of an oscillation state due to AGC concentration, and a large amount of time is required for AGC pull-in; but the AGC circuit of the read channel circuit is provided with a comparatively fast feedback response, while the feedback response speed of the AGC circuit in the head IC is made substantially slower than the feedback response speed of the AGC circuit of the read channel circuit, so that the AGC circuit of the head IC has no effect on the fast AGC operation of the AGC circuit of the read channel.

Further, because automatic level adjustment is performed within the head IC, there is no need for extra signal lines with external equipment. As a result, the head IC can more easily be mounted on the actuator.

DESCRIPTION OF THE PREFERRED EMBODIMENTS

Embodiments in this invention are explained in the following order: the media storage device, first, second, third, fourth, fifth, sixth, seventh, eighth and ninth embodiments of the read circuit, and other embodiments. However, this invention is not limited to these embodiments.

Media Storage Device

Figure 1:
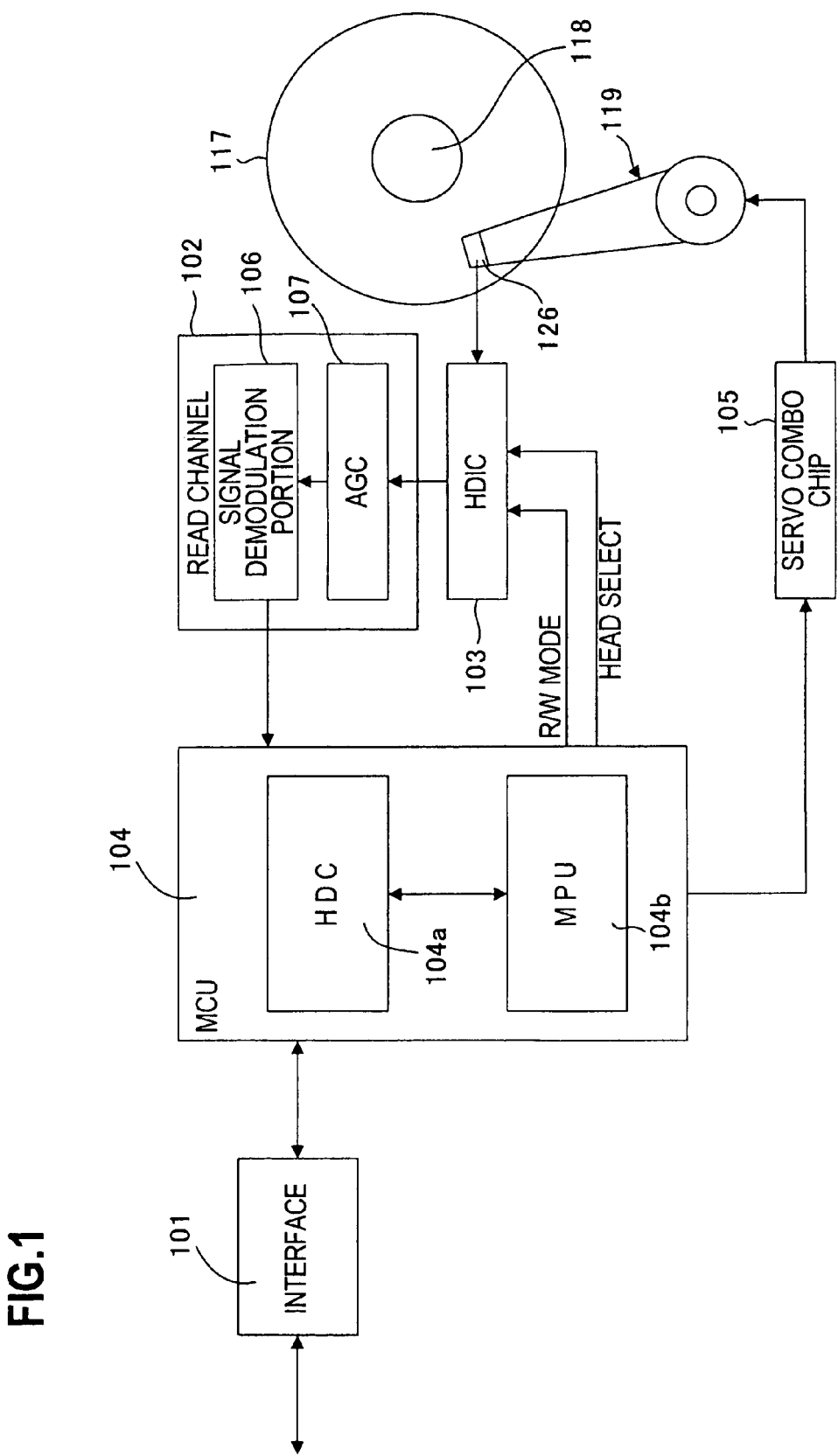
FIG. 1 shows the configuration of one embodiment of a media storage device of the invention.

FIG. 1 shows the configuration of the media storage device of one embodiment of the invention. FIG. 1 shows a magnetic disk device as the media storage device. As shown in FIG. 1, a magnetic disk 117 which is magnetic recording media is provided on a rotating shaft 118 of a spindle motor. The spindle motor rotates the magnetic disk 117. An actuator (VCM) 119 has a magnetic head 126 at the tip, and the magnetic head 126 moves in the radial direction of the magnetic disk 117.

The actuator 119 is constructed by a voice coil motor (VCM) which rotates about a rotation shaft. When the magnetic disk device is mounted two magnetic disks 117, four magnetic heads 126, which read from and write onto the different magnetic disk faces, are simultaneously driven by the same actuator 119.

A magnetic head 126 has a read element and a write element. For example, the magnetic head 126 constructed by a read element provided with a tunneling-effect magneto-resistance (TuMR) element stacked on a slider, on top of which is stacked a write element comprising a write coil.

Figure 15:
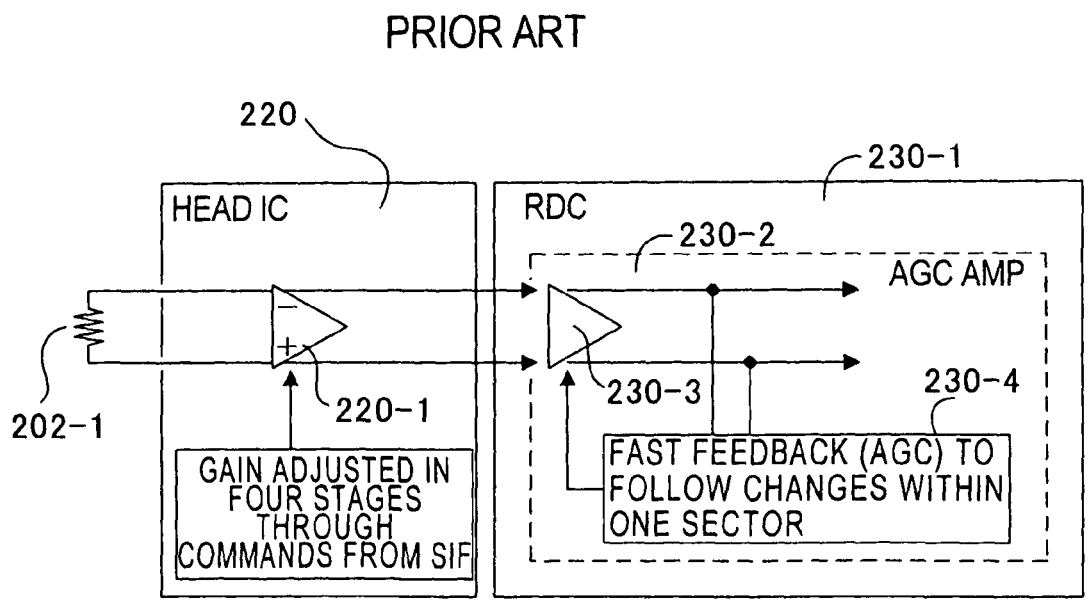
FIG. 15 explains a read circuit of the prior art.

As shown in FIG. 15, the head IC 103 is provided on a side face of the actuator 119, and as explained in FIG. 2 and later figures, has a read circuit with an AGC amplifier and a write circuit. In read mode, read signals from the read element of the magnetic head 126 are amplified and output, and in write mode, a write driving current is passed to the write element of the magnetic head 126.

The read channel 102 has a read circuit and a write circuit; the read circuit has an AGC amplifier 107 and a signal demodulation circuit 106. A microcontroller (MCU) 104 has a hard disk controller (HDC) 104a and a microprocessor (MPU) 104b.

The hard disk controller (HDC) 104a performs analysis of commands, judges a position within one circumference based on sector number in the servo signal, controls data recording and reproduction, and temporarily stores read data and write data. The MPU 104b controls various portions.

A servo combo circuit 105 detects (demodulates) a current position from the servo position signals from the signal demodulation circuit 106, and computes VCM driving instruction values for the actuator 119 according to an error between the detected current position and a target position, as well as driving the spindle motor. An interface circuit 101 communicates with the host by means of a USB (Universal Serial Bus), ATA (AT Attached), SCSI (Small Computer System Interface), or other interface.

Servo signals (position signals) are arranged at equal intervals in the circumferential direction on each track from the outermost to the innermost tracks of the magnetic disk 117. Each track comprises a plurality of sectors, and the servo signals are recorded in each sector. The servo signal has a servo mark, a track number, an index, and offset information (servo burst) PosA, PosB, PosC, PosD.

These position signals are read by the head 126, and the track number and offset information PosA, PosB, PosC, PosD are used to detect the position in the radial direction of the magnetic head. Further, the position of the magnetic head in the circumferential direction is ascertained based on the index signal "Index".

The read signal output from the read element of the magnetic head 126 are level-adjusted by the head IC 103, and are adjusted to a prescribed level by the AGC circuit 107 of the read channel 102, in order to read position signals and data.

First Embodiment of a Read Circuit

Figure 2:
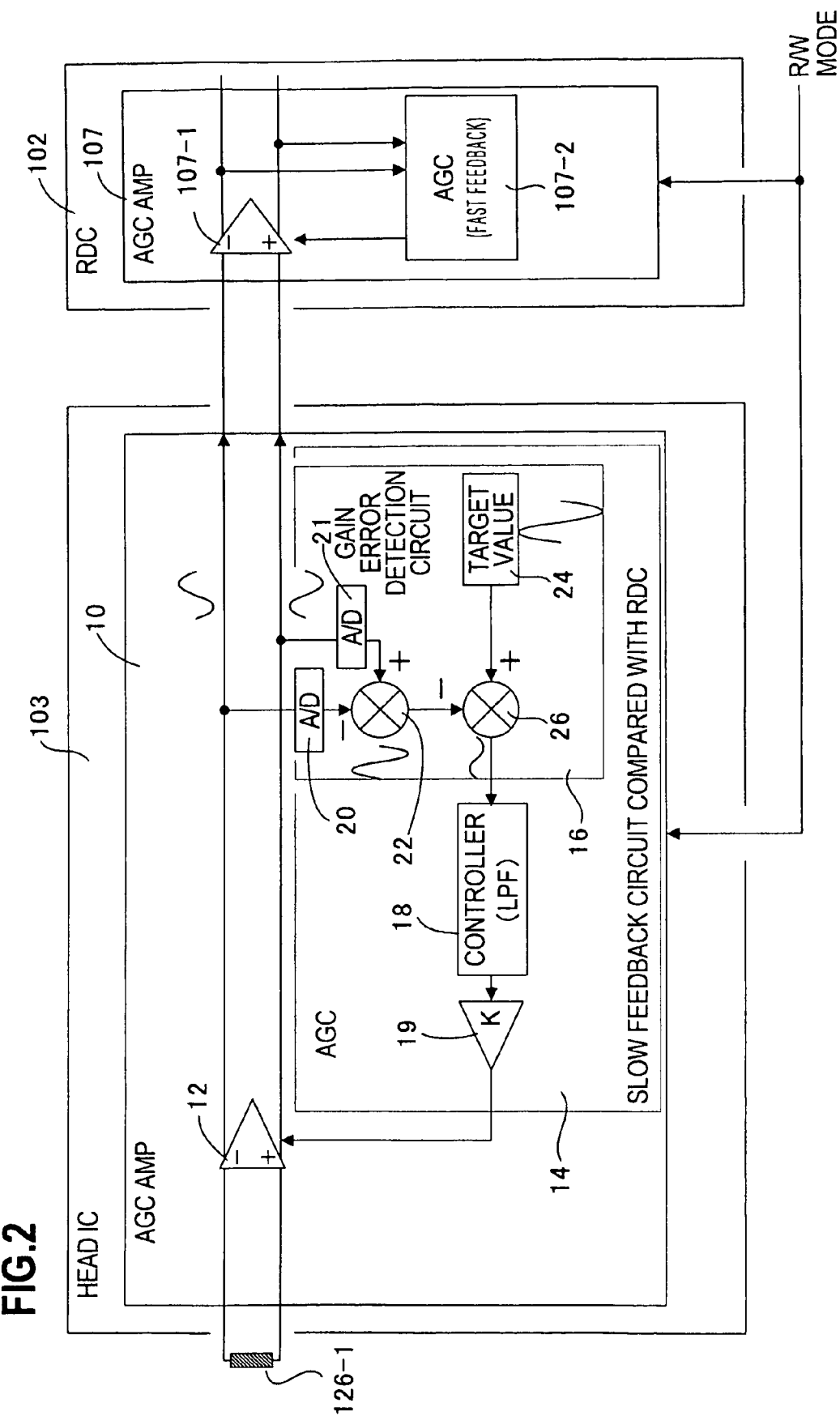
FIG. 2 is a circuit diagram of a first embodiment of a read circuit of the invention.

FIG. 2 is a circuit diagram of a first embodiment of a read circuit of the invention. In FIG. 2, portions which are the same as those shown in FIG. 1 are assigned the same symbols; the head IC 103 is provided with an AGC amplifier 10. This AGC amplifier 10 has a differential amplifier 12 connected to both ends of the read element (TuMR element) 126-1, and an AGC circuit 14 which automatically controls the gain of the differential amplifier 12.

The AGC circuit 14 has a gain error detection circuit 16, a feedback controller (low-pass filter) 18, and a gain multiplier 19.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs from the A/D converters 20 and 21 and extracts the amplitude; a memory 24 which stores an amplitude target value (waveform); and a second computation unit 26 which computes the difference between the target value for the amplitude in memory 24 and the detected amplitude from the first computation unit 22. This difference is the gain error.

The feedback controller 18 is constructed by a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

In the read channel circuit 102 is provided an AGC amplifier 107, having a differential amplifier 107-1 and an AGC circuit 107-2. The configuration of the AGC circuit 107-2 is the same as that of the AGC circuit 14 of the head IC 103, and an explanation is omitted.

The cutoff frequency of the low-pass filter 18 in the AGC circuit 14 of the head IC 103 is set to a frequency lower than the cutoff frequency of the low-pass filter in the AGC circuit 107-2 of the read channel circuit 102, and the feedback gain K of the gain multiplier 19 in the AGC circuit 14 of the head IC 103 is set to be smaller than the feedback gain of the gain multiplier in the AGC circuit 107-2 of the read channel circuit 102.

By this means, the feedback response speed of the AGC circuit 14 of the head IC 103 is made slower than the feedback response speed of the AGC circuit 107-2 of the read channel circuit 102.

That is, the AGC circuit 107-2 of the read channel circuit 102 must adjust the output level within one sector, and so comparatively fast feedback response (at high frequency, with high feedback gain) is necessary. On the other hand, the feedback response speed of the AGC circuit 14 of the head IC 103 is set to be substantially slower than the feedback response speed of the AGC circuit 107-2 of the read channel 102. For example, the feedback response speed may be such as to enable following of amplitude changes over a dozen or more sectors.

This read operation is explained as follows. First, the voltage between both terminals of the read element 126-1 is input to the differential amplifier 12 of the head IC 103, and a pair of differential amplified signals is output. This pair of differential amplified signals is input to the differential amplifier 107-1 of the AGC amplifier 107 in the read channel circuit 102.

On the other hand, in the AGC circuit 14 of the AGC amplifier 10, the first and second A/D converters 20 and 21 perform analog-digital conversion of the negative-side voltage and positive-side voltage of the differential amplifier 12, and the first computation unit 22 takes the difference of the outputs of the A/D converters 20 and 21 and extracts the amplitude.

Next, the second computation unit 26 computes the difference between the target value of the amplitude retrieved from the memory 24 in which is stored the amplitude target value (waveform), and the detected amplitude from the first computation unit 22, and outputs the gain (amplification factor) error. The low-pass filter 18 cuts off high-frequency components in the gain error signal at a preset cutoff frequency, and outputs the low-frequency gain error signal. The gain multiplier 19 multiplies the output from the low-pass filter 18 by the feedback gain K, determines the amplification factor, and controls the differential amplifier 12.

Similarly, the AGC circuit 107-2 of the read channel 102 detects the gain error signal from the pair of differentially amplified signals from the differential amplifier 107-1, and after processing by the low-pass filter and gain multiplier determines the amplification factor, to control the gain of the differential amplifier 107-1.

Thus, in the first place, an AGC amplifier 10 is provided in the head IC 103, so that the amplitude from the head 126-1 is automatically adjusted within the head IC 103, and signals can be adjusted to signal levels within the input dynamic range of the AGC amplifier 107 of the read channel 102.

Secondly, when two AGC circuits are operating simultaneously, there is the danger that an oscillation state may occur due to AGC contention, so that an excessive amount of time is required for AGC pull-in. However, in this invention the AGC circuit 107-2 of the read channel 102 is provided with a comparatively fast feedback response (high frequency and high feedback gain) given the constraint of adjusting the output level within one sector, while on the other hand the feedback response speed of the AGC circuit 14 of the head IC 103 is made substantially slower than the feedback response feed of the AGC circuit 107-2 of the read channel circuit 102 (for example, a feedback response speed enabling following only of amplitude changes over a dozen or more sectors).

Consequently the AGC circuit 14 of the head IC 103 does not affect the faster AGC operation of the AGC circuit 107-2 of the read channel 102. That is, the AGC circuit 14 in the head IC 103 hardly follows at all the fast changes in amplitude which are followed by the AGC circuit 107-2 of the read channel 102, but instead follows slow amplitude changes. Hence no contention between AGC circuits occurs even when two AGC circuits are provided. As a result, lengthening of the AGC pull-in time due to oscillation states can be prevented.

Figure 14:
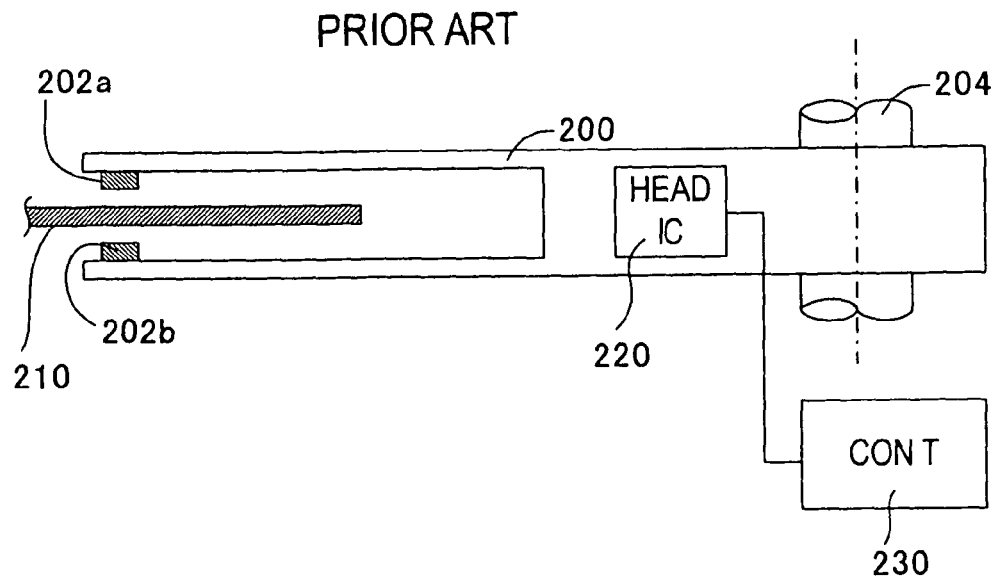
FIG. 14 explains a media storage device of the prior art.

Further, in this embodiment level adjustment is automatically performed within the head IC, so that extra signal lines with external equipment are unnecessary. Consequently, as explained using FIG. 14, the head IC can more easily be mounted on the actuator.

Second Embodiment of a Read Circuit

Figure 3:
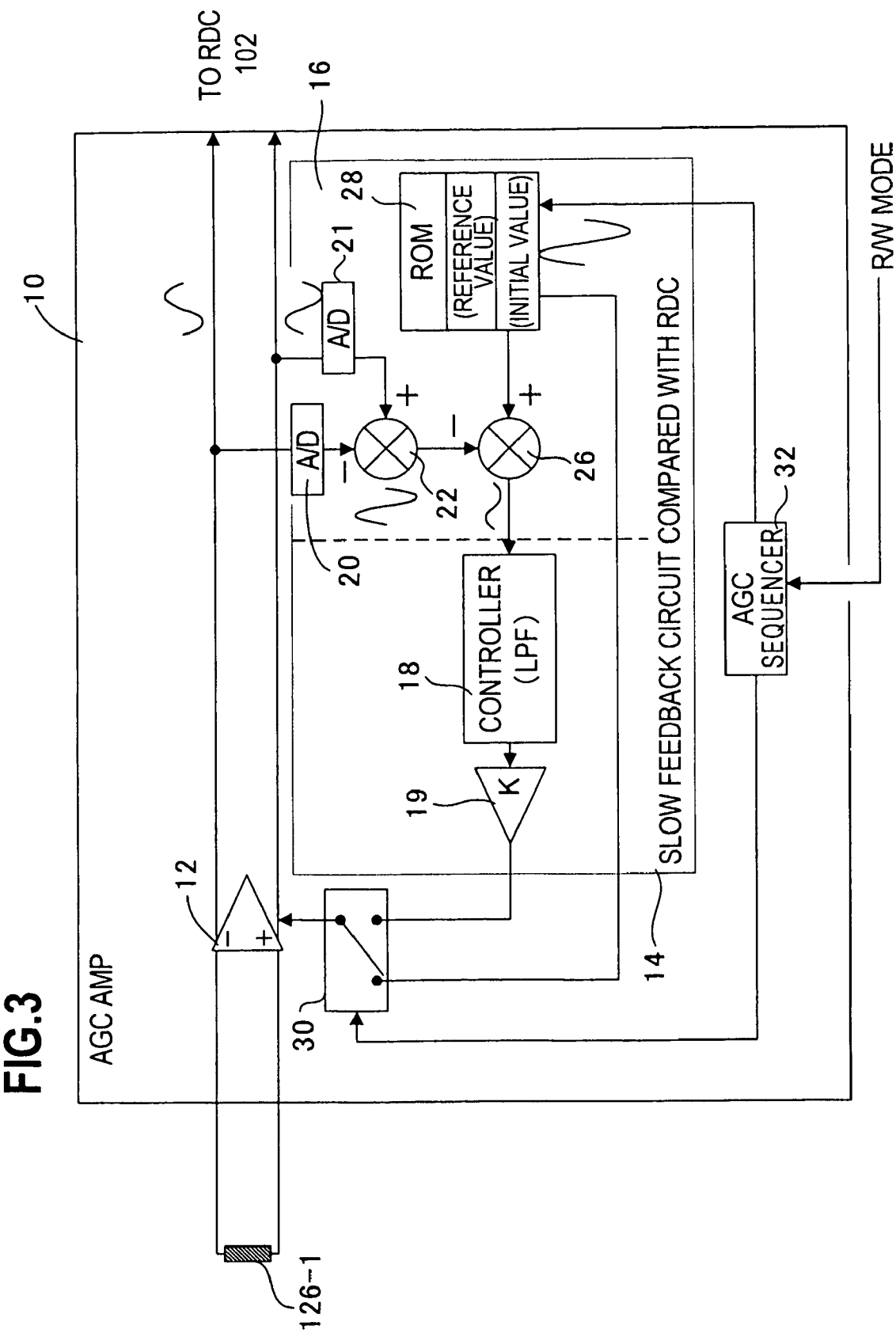
FIG. 3 is a circuit diagram of a second embodiment of a read circuit of the invention.

FIG. 3 is a circuit diagram of a second embodiment of a read circuit of the invention. In FIG. 3, portions which are the same as in FIG. 1 and FIG. 2 are assigned the same symbols; only the AGC amplifier 10 of the head IC 103 is shown, and the read channel 102 is omitted. The configuration of the read channel 102 is the same as in FIG. 2.

As shown in FIG. 3, the AGC amplifier 10 has the differential amplifier 12 connected across both terminals of the read element (TuMR element) 126-1, and an AGC circuit 14 which automatically controls the gain of the differential amplifier 12.

The AGC circuit 14 has a gain error detection circuit 16; a feedback controller (low-pass filter) 18; a gain multiplier 19; a switch 30; and an AGC sequencer 32.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs of the A/D converters 20 and 21, and extracts the amplitude; a memory 28 which stores the amplitude target value (waveform) and gain initial value; and a second computation unit 26, which computes the difference between the amplitude target value in the memory 28 and the detected amplitude from the first computation unit 22. This difference is the gain error.

The feedback controller 18 is constructed by a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

In this embodiment also, the cutoff frequency of the low-pass filter 18 in the AGC circuit 14 of the head IC 103 is set to be lower than the cutoff frequency of the low-pass filter of the AGC circuit 107-2 in the read channel circuit 102 of FIG. 2. And moreover the feedback gain K of the gain multiplier 19 of the AGC circuit 14 of the head IC 103 is set to be smaller than the feedback gain of the gain multiplier of the AGC circuit 107-2 in the read channel circuit 102.

By this means, the feedback response speed of the AGC circuit 14 of the head IC 103 is set to be slower than the feedback response speed of the AGC circuit 107-2 of the read channel circuit 102.

The gain initial value is stored in the memory 28. When the AGC sequencer 32 receives a read mode instruction by means of a read/write mode instruction signal, the AGC sequencer 32 reads the gain initial value in the memory 28, and after setting the value in the differential amplifier 12 by means of the switch 30, then switches the switch 30 to the AGC circuit 14 (that is, the gain multiplier 19).

That is, in order to prevent contention, the feedback response speed of the AGC circuit 14 of the head IC 103 is set to be slow, and so upon startup and during mode-switching, the pull-in time is made longer. In order to prevent this, the gain initial value is stored, and the initial value is set in the differential amplifier 12 upon startup and during mode-switching. Hence even when the feedback response speed of the AGC circuit 14 is slow, the pull-in time can be shortened. In addition, changes in the pull-in time due to head characteristics can also be prevented.

Third Embodiment of a Read Circuit

Figure 4:
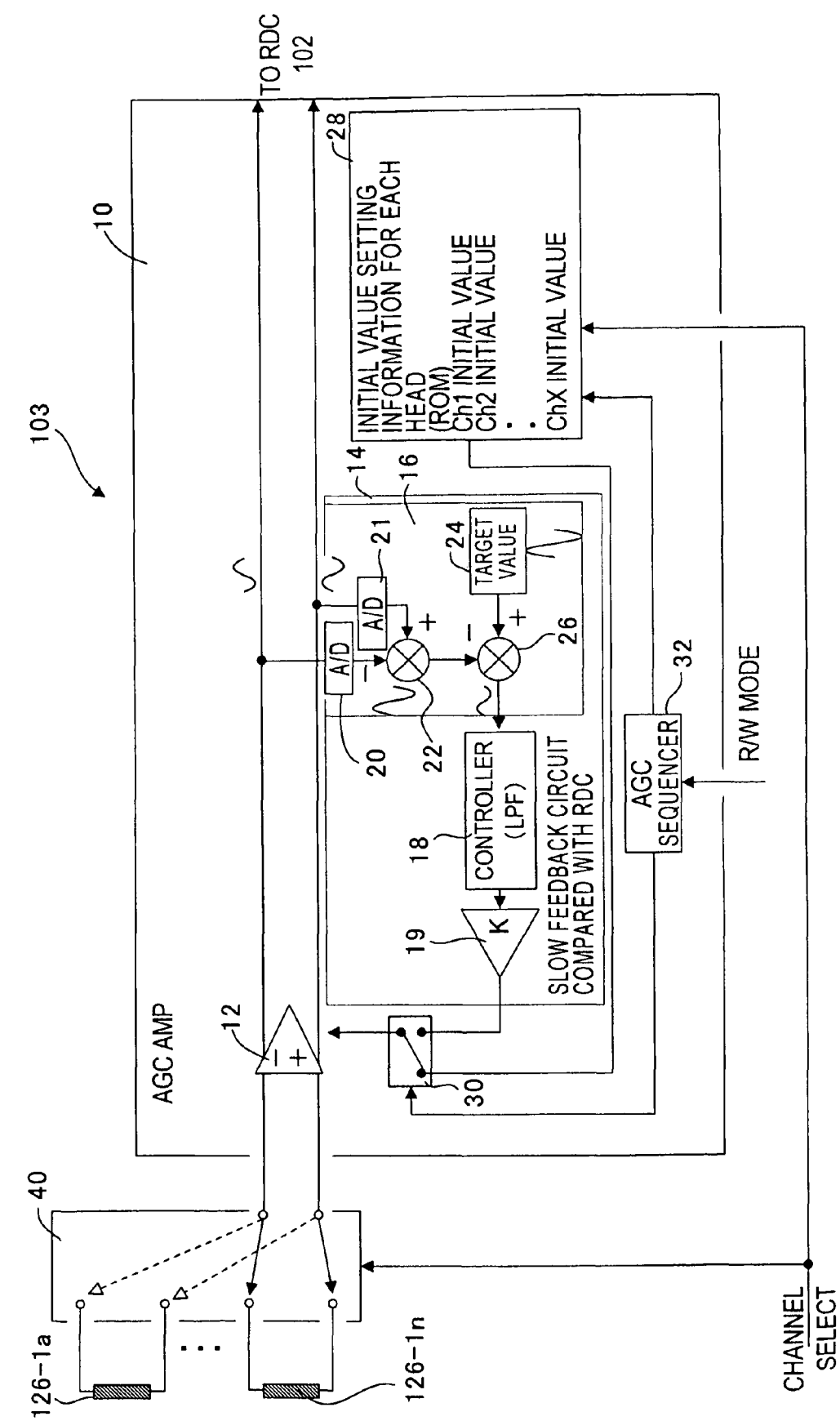
FIG. 4 is a circuit diagram of a third embodiment of a read circuit of the invention.

FIG. 4 is a circuit diagram of a third embodiment of a read circuit of this invention. In FIG. 4, portions which are the same as in FIG. 1, FIG. 2 and FIG. 3 are assigned the same symbols; only the AGC amplifier 10 of the head IC 103 and the head switching circuit 40 are shown, and the read channel 102 is omitted. The configuration of the read channel 102 is the same as in FIG. 2.

As shown in FIG. 4, single AGC amplifier 10 handles the signals of a plurality of read elements (TuMR elements) 126-1a to 126-1n. The head-switching switch 40 switches the connection between the plurality of read elements, 126-1a to 126-1n, and the differential amplifier 12, according to a channel (head) selection signal.

The AGC amplifier 10 has a differential amplifier 12 which is connected to this head-switching switch 40, and an AGC circuit 14 which automatically controls the gain of the differential amplifier 12. The AGC circuit 14 has a gain error detection circuit 16, a feedback controller (low-pass filter) 18, a gain multiplier 19, a switch 30, and an AGC sequencer 32.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs from the A/D converters 20 and 21 and extracts the amplitude; a memory 24 which stores an amplitude target value (waveform); and a second computation unit 26 which computes the difference between the target value for the amplitude in the memory 24 and the detected amplitude from the first computation unit 22. This difference is the gain error.

The feedback controller 18 is constructed of a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

In this embodiment also, the cutoff frequency of the low-pass filter 18 in the AGC circuit 14 of the head IC 103 is set to a frequency lower than the cutoff frequency of the low-pass filter in the AGC circuit 107-2 of the read channel circuit 102 in FIG. 2. And the feedback gain K of the gain multiplier 19 in the AGC circuit 14 of the head IC 103 is set to be smaller than the feedback gain of the gain multiplier in the AGC circuit 107-2 of the read channel circuit 102.

By this means, the feedback response speed of the AGC circuit 14 of the head IC 103 is set to be slower than the feedback response speed of the AGC circuit 107-2 of the read channel circuit 102.

Further, memory (ROM) 28 to store gain initial values for each head, a switch 30, and an AGC sequencer 32 are provided. When the AGC sequencer 32 receives a read mode instruction by means of a read/write mode instruction signal, the AGC sequencer 32 reads the gain initial value in the memory 28. At this time, the head-switching switch 40 is operated by a channel selection signal, the read element of the selected head is connected to the differential amplifier 12, and the channel number of the initial value to be read from the memory 28 is indicated.

Hence when the AGC sequencer 32 reads the initial value in the memory 28, the initial value of the channel (head) specified by the channel selection signal is read and is set in the differential amplifier 12 via the switch 30. After reading, the AGC sequencer 32 switches the switch 30 to the AGC circuit 14 (that is, the gain multiplier 19).

That is, in order to prevent contention, the feedback response speed of the AGC circuit 14 of the head IC 103 is made slow, so that upon startup and during mode switching, the pull-in time is long. In order to prevent this, a gain initial value is stored, and upon startup and mode-switching, is initially set in the differential amplifier 12. Hence even when the feedback response speed of the AGC circuit 14 is slow, the pull-in time can be shortened.

In addition, gain initial values are stored according to scattering in the characteristics of each head (read element), and upon head selection, at startup or during mode switching, the initial value is set in the differential amplifier 12. Hence even when the feedback response speed of the AGC circuit 14 is slow, the pull-in time can be shortened regardless of the characteristics of individual heads. Moreover, changes in the pull-in time due to head characteristics can be prevented.

Fourth Embodiment of a Read Circuit

Figure 5:
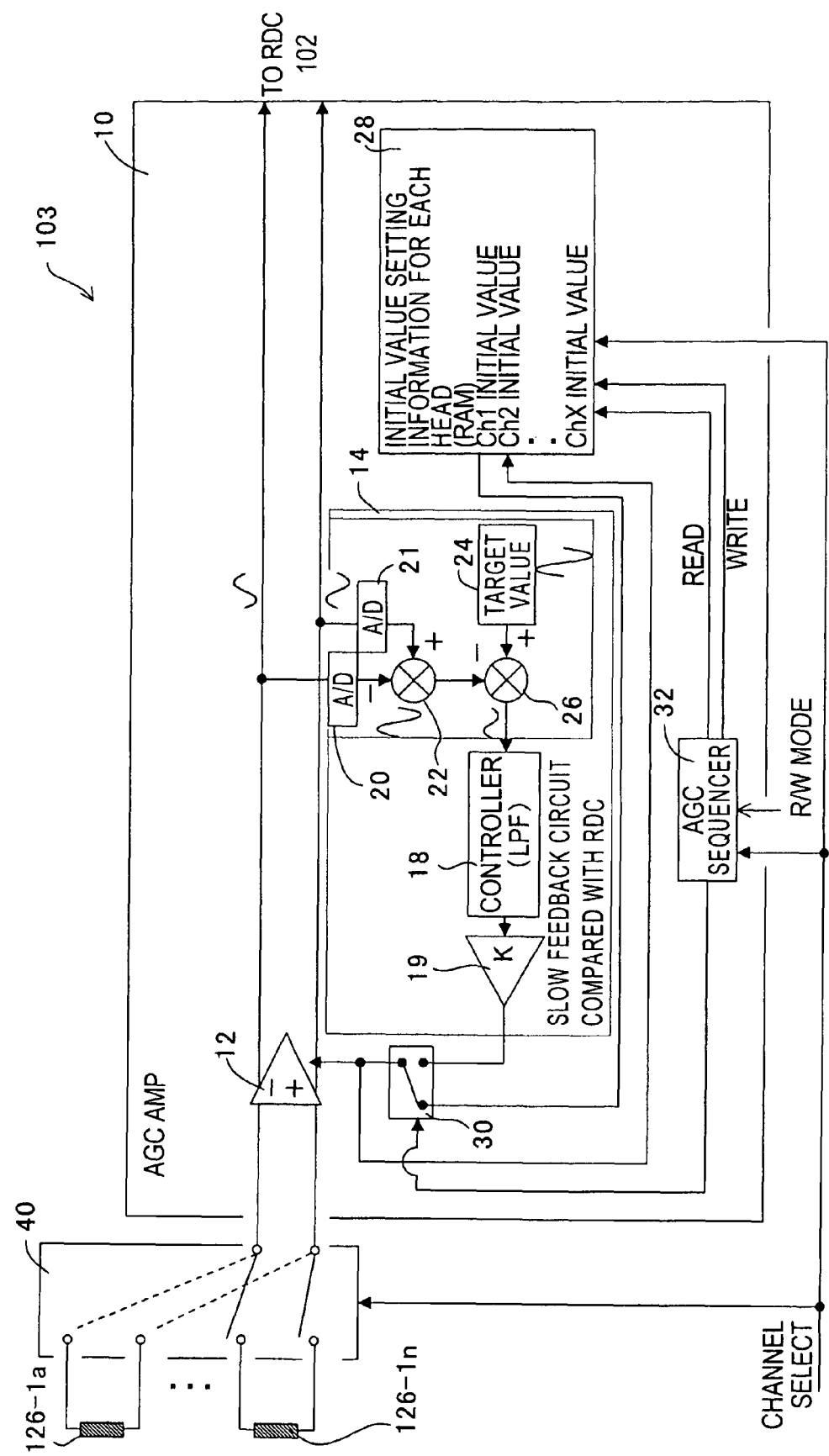
FIG. 5 is a circuit diagram of a fourth embodiment of a read circuit of the invention.

FIG. 5 is a circuit diagram of a fourth embodiment of a read circuit of the invention. In FIG. 5, portions which are the same as in FIG. 1, FIG. 2, FIG. 3, and FIG. 4 are assigned the same symbols; only the AGC amplifier 10 of the head IC 103 and the head-switching circuit 40 are shown, and the read channel 102 is omitted. The configuration of the read channel 102 is the same as in FIG. 2.

As shown in FIG. 5, single AGC amplifier 10 handles the signals of a plurality of read elements (TuMR elements) 126-1a to 126-1n. The head-switching switch 40 switches the connection between the plurality of read elements, 126-1a to 126-1n, and the differential amplifier 12, according to a channel (head) selection signal.

The AGC amplifier 10 has a differential amplifier 12 which is connected to this head-switching switch 40, and an AGC circuit 14 which automatically controls the gain of the differential amplifier 12. The AGC circuit 14 has a gain error detection circuit 16, a feedback controller (low-pass filter) 18, a gain multiplier 19, a switch 30, and an AGC sequencer 32.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs from the A/D converters 20 and 21 and extracts the amplitude; a memory 24 which stores an amplitude target value (waveform); and a second computation unit 26 which computes the difference between the target value for the amplitude in the memory 24 and the detected amplitude from the first computation unit 22. This difference is the gain error.

The feedback controller 18 is constructed by a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

In this embodiment also, the cutoff frequency of the low-pass filter 18 in the AGC circuit 14 of the head IC 103 is set to be lower than the cutoff frequency of the low-pass filter of the AGC circuit 107-2 in the read channel circuit 102 of FIG. 2. And moreover the feedback gain K of the gain multiplier 19 of the AGC circuit 14 of the head IC 103 is set to be smaller than the feedback gain of the gain multiplier of the AGC circuit 107-2 in the read channel circuit 102.

By this means, the feedback response speed of the AGC circuit 14 of the head IC 103 is set to be slower than the feedback response speed of the AGC circuit 107-2 of the read channel circuit 102.

Further, a memory (RAM) 28 to store gain initial values for each head, a switch 30, and an AGC sequencer 32 are provided. When the AGC sequencer 32 receives a read mode instruction by means of a read/write mode instruction signal, the gain initial value in memory 28 is read. At this time, the head-switching switch 40 is operated by a channel selection signal, the read element of the selected head is connected to the differential amplifier 12, and the channel number of the initial value to be read from memory 28 is indicated.

Hence when the AGC sequencer 32 reads the initial value in memory 28, the initial value of the channel (head) specified by the channel selection signal is read and is set in the differential amplifier 12 via the switch 30. After reading, the AGC sequencer 32 switches the switch 30 to the AGC circuit 14 (that is, the gain multiplier 19).

Further, at the time of mode switching (from read mode to write mode, or a channel selection change), the AGC sequencer 32 writes the gain setting from the gain multiplier 19 immediately before switching to memory 28, and updates the initial value of the corresponding channel.

In this example also, in order to prevent contention, the feedback response speed of the AGC circuit 14 of the head IC 103 is made slow, so that upon startup and during mode switching, the pull-in time is long. In order to prevent this, a gain initial value is stored, and upon startup and mode-switching, is initially set in the differential amplifier 12. Hence even when the feedback response speed of the AGC circuit 14 is slow, the pull-in time can be shortened.

In addition, gain initial values are stored according to scattering in the characteristics of each head (read element), and upon head selection, at startup or during mode switching, the initial value is set in the differential amplifier 12. Further, the initial values are updated to the actual values immediately before switching, and the optimum initial values are always stored. Hence even when the feedback response speed of the AGC circuit 14 is slow, the pull-in time can be shortened regardless of the characteristics of individual heads. Moreover, changes in the pull-in time due to head characteristics or temperature changes can be prevented.

Fifth Embodiment of a Read Circuit

Figure 6:
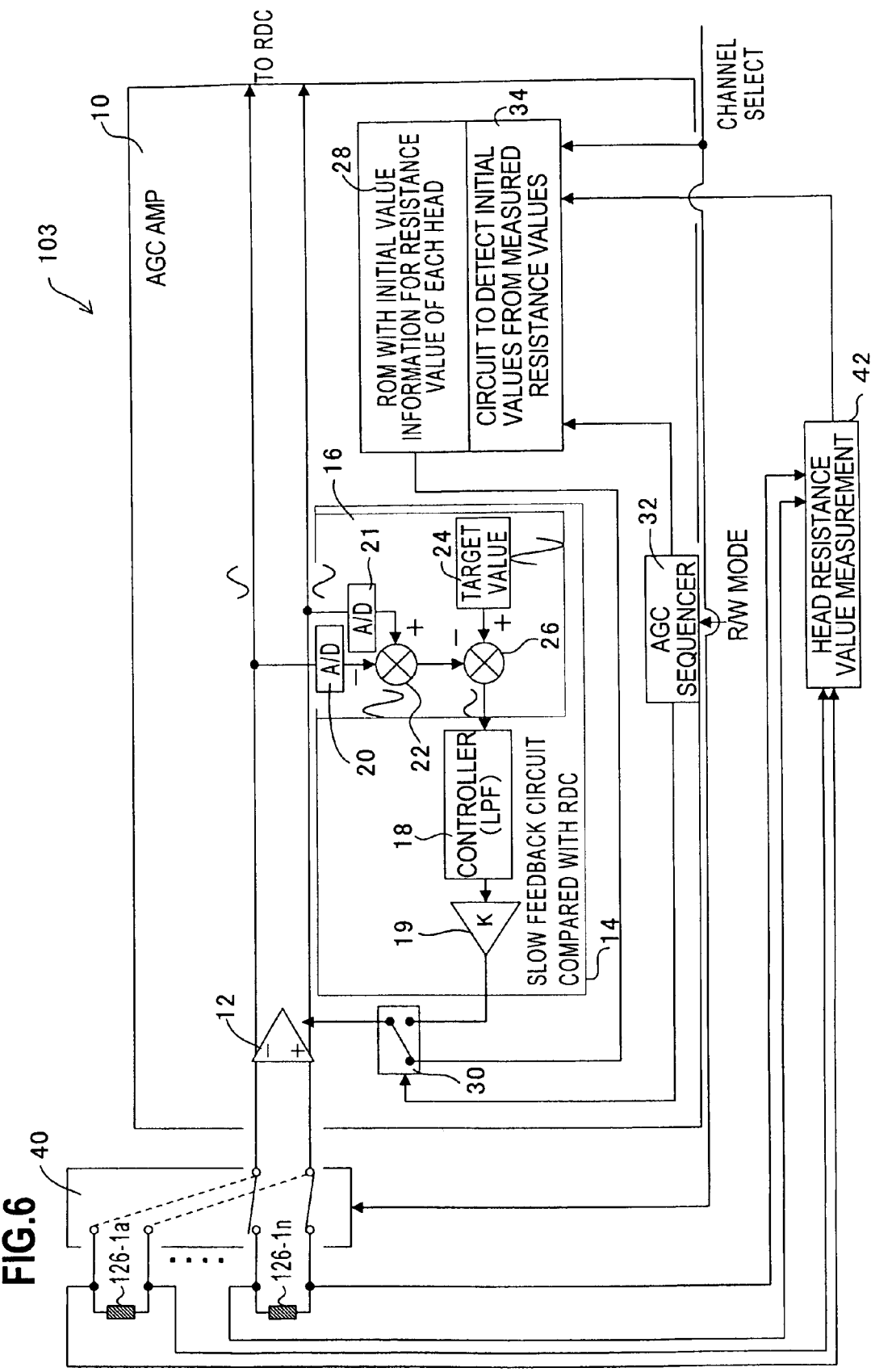
FIG. 6 is a circuit diagram of a fifth embodiment of a read circuit of the invention.

FIG. 6 is a circuit diagram of a fifth embodiment of a read circuit of the invention. In FIG. 6, portions which are the same as in FIG. 1, FIG. 2, FIG. 3, FIG. 4, and FIG. 5 are assigned the same symbols; only the AGC amplifier 10 of the head IC 103 and the head-switching circuit 40 are shown, and the read channel 102 is omitted. The configuration of the read channel 102 is the same as in FIG. 2.

As shown in FIG. 6, single AGC amplifier 10 handles the signals of a plurality of read elements (TuMR elements) 126-1a to 126-1n. The head-switching switch 40 switches the connection between the plurality of read elements, 126-1a to 126-1n, and the differential amplifier 12, according to a channel (head) selection signal.

The AGC amplifier 10 has a differential amplifier 12 which is connected to this head-switching switch 40, and an AGC circuit 14 which automatically controls the gain of the differential amplifier 12. The AGC circuit 14 has a gain error detection circuit 16, a feedback controller (low-pass filter) 18, a gain multiplier 19, a switch 30, and an AGC sequencer 32.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs from the A/D converters 20 and 21 and extracts the amplitude; memory 24 which stores an amplitude target value (waveform); and a second computation unit 26 which computes the difference between the target value for the amplitude in memory 24 and the detected amplitude from the first computation unit 22. This difference is the gain error.

The feedback controller 18 is constructed by a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

In this embodiment also, the cutoff frequency of the low-pass filter 18 in the AGC circuit 14 of the head IC 103 is set to be lower than the cutoff frequency of the low-pass filter of the AGC circuit 107-2 in the read channel circuit 102 of FIG. 2. And moreover the feedback gain K of the gain multiplier 19 of the AGC circuit 14 of the head IC 103 is set to be smaller than the feedback gain of the gain multiplier of the AGC circuit 107-2 in the read channel circuit 102.

By this means, the feedback response speed of the AGC circuit 14 of the head IC 103 is set to be slower than the feedback response speed of the AGC circuit 107-2 of the read channel circuit 102.

Further, memory (RAM) 28 to store gain initial values for each head, an initial value detection circuit 34, a switch 30, and an AGC sequencer 32 are provided in the head IC 103.

Further, the head resistance measurement circuit 42 provided in the MCU 104 of FIG. 1 is used, at the time of shipment from the factory, to pass a current through each of the read elements 126-1a to 126-1n and measure the voltage across the terminals, to measure the resistance value of each read element. The bias currents to be passed through the read elements are determined according to these measured resistance values, and are set in the MCU 104.

First, at the time of shipment from the factory, the head resistance measurement circuit 42 measures the resistance value of each read element as explained above. The initial value detection circuit 34 provided in the AGC amplifier 10 or MCU 104 estimates the output levels from the resistance values measured by this head resistance measurement circuit 42, and detects (calculates) the gain initial values for each head from the estimated output levels. Then, the calculated gain initial values are written to the above-described memory 28.

When the AGC sequencer 32 receives a read mode instruction by means of a read/write mode instruction signal, the gain initial value in memory 28 is read. At this time, the head-switching switch 40 is operated by a channel selection signal, the read element of the selected head is connected to the differential amplifier 12, and the channel number of the initial value to be read from memory 28 is indicated.

Hence when the AGC sequencer 32 reads the initial value in memory 28, the initial value of the channel (head) specified by the channel selection signal is read and is set in the differential amplifier 12 via the switch 30. After reading, the AGC sequencer 32 switches the switch 30 to the AGC circuit 14 (that is, the gain multiplier 19).

In this example also, in order to prevent contention, the feedback response speed of the AGC circuit 14 of the head IC 103 is made slow, so that upon startup and during mode switching, the pull-in time is long. In order to prevent this, a gain initial value is stored, and upon startup and mode-switching, is initially set in the differential amplifier 12. Hence even when the feedback response speed of the AGC circuit 14 is slow, the pull-in time can be shortened.

In addition, gain initial values are stored according to scattering in the characteristics of each head (read element), and upon head selection, at startup or during mode switching, the initial values are set in the differential amplifier 12. Further, the initial values are updated to the actual values immediately before switching, and the optimum initial values are always stored. Hence even when the feedback response speed of the AGC circuit 14 is slow, the pull-in time can be shortened regardless of the characteristics of individual heads. By using the results of resistance measurements performed to set existing bias currents, the gain initial values for each head are easily set.

Sixth Embodiment of a Read Circuit

Figure 7:
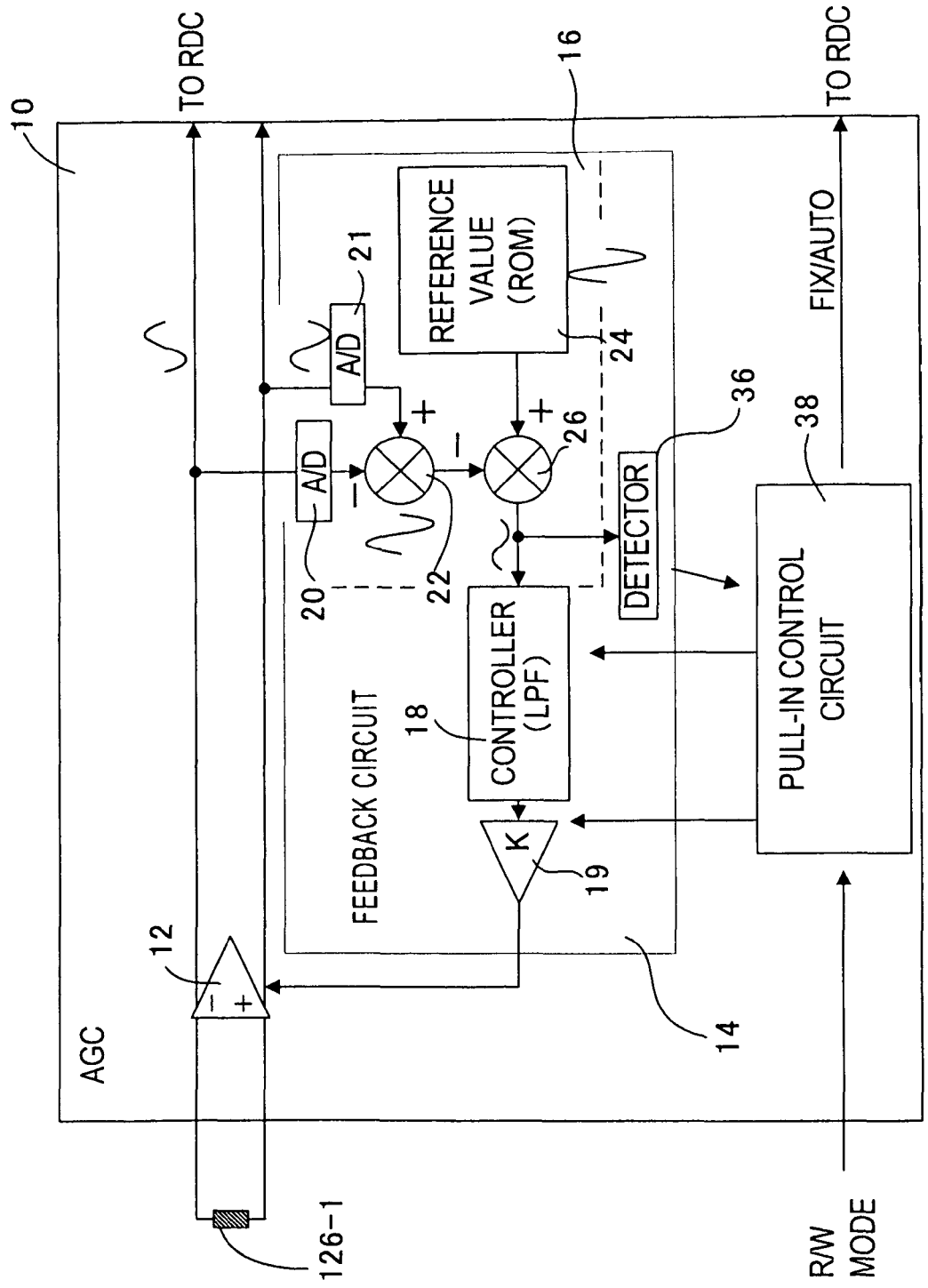
FIG. 7 is a circuit diagram of a sixth embodiment of a read circuit of the invention.
Figure 8:
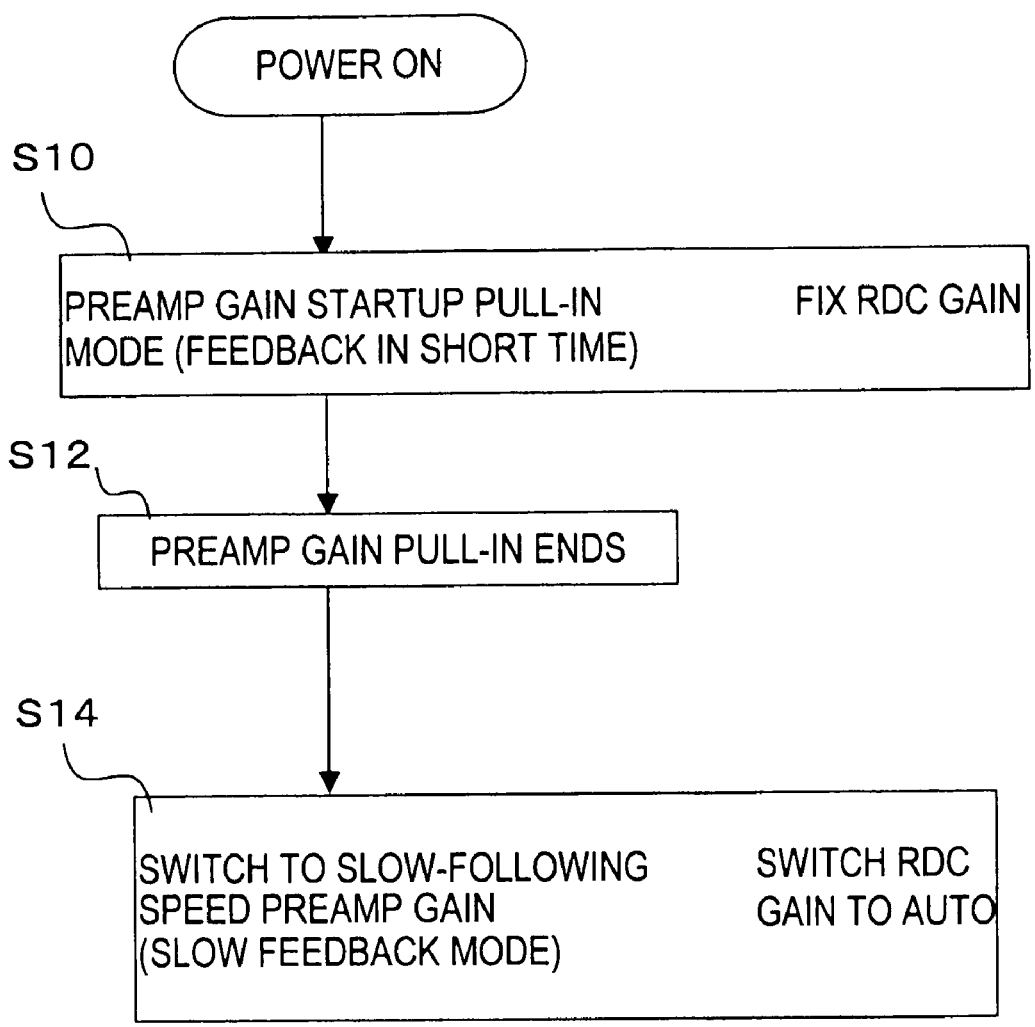
FIG. 8 explains the AGC control sequence of FIG. 7.

FIG. 7 is a circuit diagram of a sixth embodiment of a read circuit of the invention, and FIG. 8 shows the flow of operation of the configuration in FIG. 7. In FIG. 7, portions which are the same as in FIG. 1 and FIG. 2 are assigned the same symbols; only the AGC amplifier 10 of the head IC 103 is shown, and the read channel 102 is omitted. The configuration of the read channel 102 is the same as in FIG. 2.

As shown in FIG. 7, the AGC amplifier 10 has a differential amplifier 12 which is connected to both terminals of a read element (TuMR element) 126-1, an AGC circuit 14 which automatically controls the gain of the differential amplifier 12, and a pull-in control circuit 38.

The AGC circuit 14 has a gain error detection circuit 16, a feedback controller (low-pass filter) 18, a gain multiplier 19, and a pull-in completion detection circuit 36.

The gain error detector 16 has a first A/D converter 20, which performs analog-digital conversion of the negative-side voltage of the differential amplifier 12, a second A/D converter 21, which performs analog-digital conversion of the positive-side voltage of the differential amplifier 12, a first computation unit 22, which takes the difference of the outputs from the A/D converters 20 and 21 and extracts the amplitude, a memory 24 which stores an amplitude target value (waveform), and a second computation unit 26 which computes the difference between the target value for the amplitude in the memory 24 and the detected amplitude from the first computation unit 22. This difference is the gain error.

The feedback controller 18 is constructed by a low-pass filter, which cuts out high-frequency components in the gain error signal, forming a loop so as to follow low-frequency gain error signals. The gain multiplier 19 multiplies the output of the low-pass filter 18 by 'K', which is the feedback gain, determines the amplification factor, and controls the gain of the differential amplifier 12. If the value of this feedback gain K is small, the feedback response is slow; if the feedback gain K is large, the feedback response is fast.

Operation of this embodiment is explained referring to FIG. 8.

(S10) Upon startup of read mode, the pull-in control circuit 38 sets the cutoff frequency of the low-pass filter 18 in the AGC circuit 14 of the head IC 103 to a higher value fh, and sets the gain K of the gain multiplier 19 to a large value Kh, and notifies the read channel 102 of the startup pull-in mode (FIX). Hence the AGC circuit 14 has fast feedback response, and the AGC pull-in time is short. At this time, the AGC circuit 107-2 of the read channel 102 fixes the gain of the differential amplifier in response to the notification of the pull-in mode, so that AGC contention can be prevented.

(S12) The pull-in completion detection circuit 36 judges that gain error signals from the second computation unit 26 have converged. Upon judging that gain error signals have converged, the detection circuit 36 notifies the pull-in control circuit 38 of pull-in completion.

(S14) The pull-in control circuit 38 sets the cutoff frequency of the low-pass filter 18 in the AGC circuit 14 of the head IC 103 to the low value fl, sets the gain K of the gain multiplier 19 to the small value Kl, and notifies the read channel 102 of startup mode completion. As a result, the AGC circuit 107-2 of the read channel initiates automated control of the gain of the differential amplifier.

Hence the cutoff frequency of the low-pass filter 18 in the AGC circuit 14 of the head IC 103 is set lower than the cutoff frequency of the low-pass filter in the AGC circuit 107-2 of the read channel circuit 102 in FIG. 2, and moreover the feedback gain K of the gain multiplier 19 in the AGC circuit 14 of the head IC 103 is set smaller than the feedback gain of the gain multiplier in the AGC circuit 107-2 of the read channel circuit 102.

As a result, the feedback response speed of the AGC circuit 14 of the head IC 103 is set to be slower than the feedback response speed of the AGC circuit 107-2 of the read channel circuit 102.

That is, in order to prevent contention, the feedback response speed of the AGC circuit 14 of the head IC 103 is set to be slow, and so upon startup or during mode switching, the pull-in time is long. In order to prevent this, upon startup a fast feedback response speed is set, and the gain on the read channel side is fixed. Also, upon pull-in completion by the AGC circuit 14, the feedback response speed (lock-in speed) is made slow. Consequently even when the feedback response speed of the AGC circuit 14 is made slow, the pull-in time can be shortened. Further, changes in pull-in time due to the head characteristics can also be prevented.

Seventh Embodiment of a Read Circuit

Figure 9:
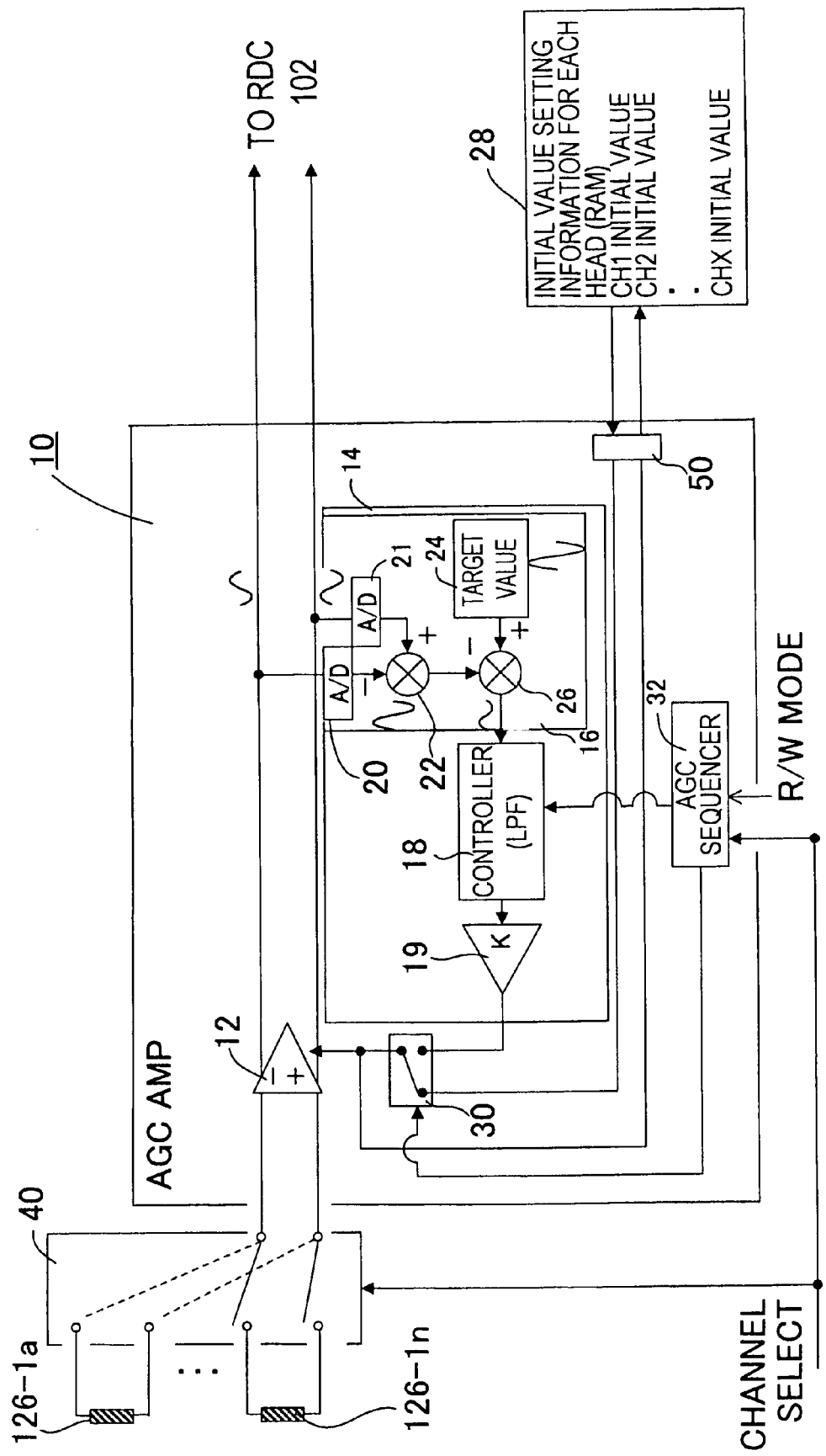
FIG. 9 is a circuit diagram of a seventh embodiment of a read circuit of the invention.
Figure 10:
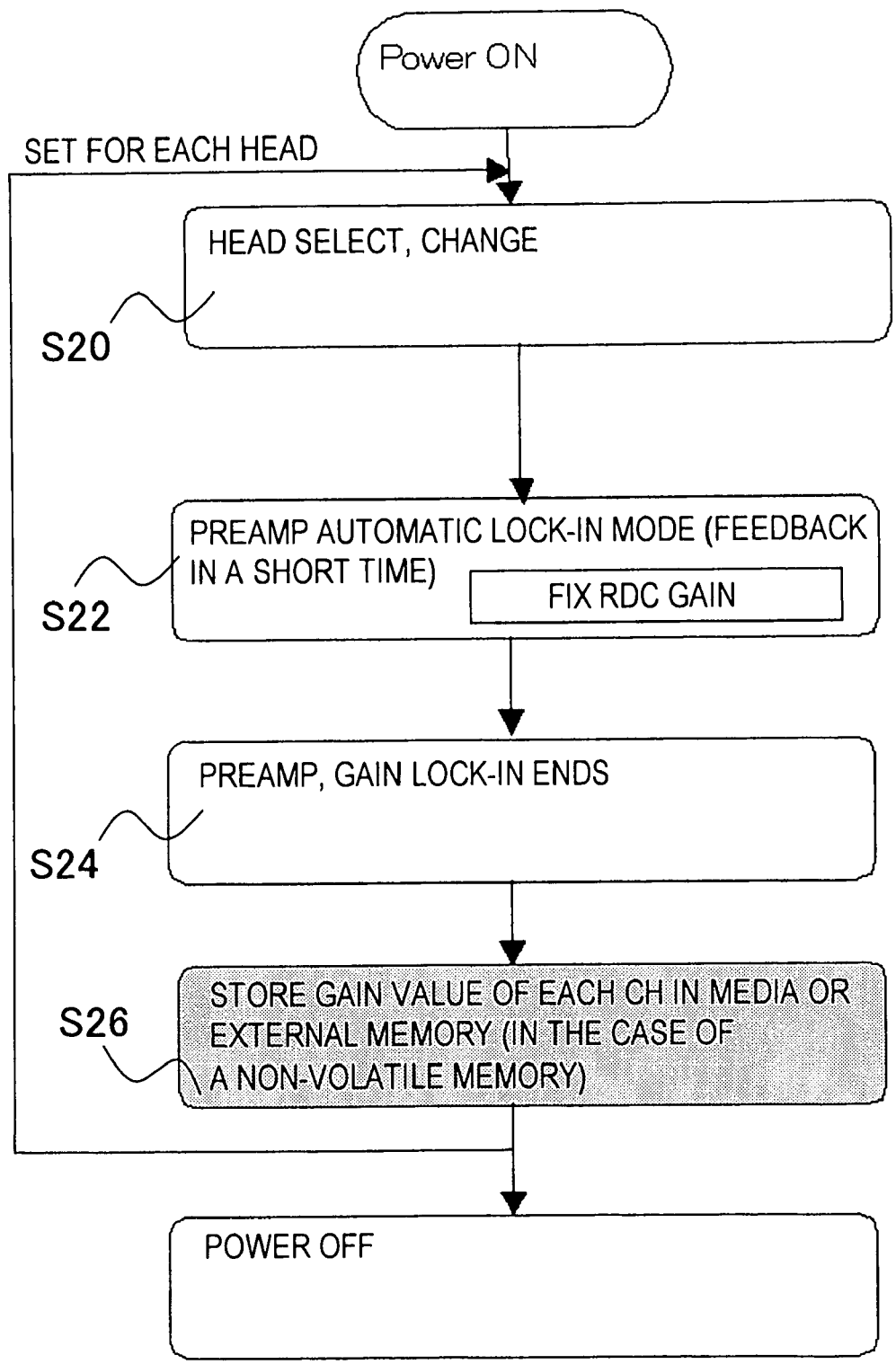
FIG. 10 is a processing flow of measuring an initial gain of the AGC shown in FIG. 9.
Figure 11:
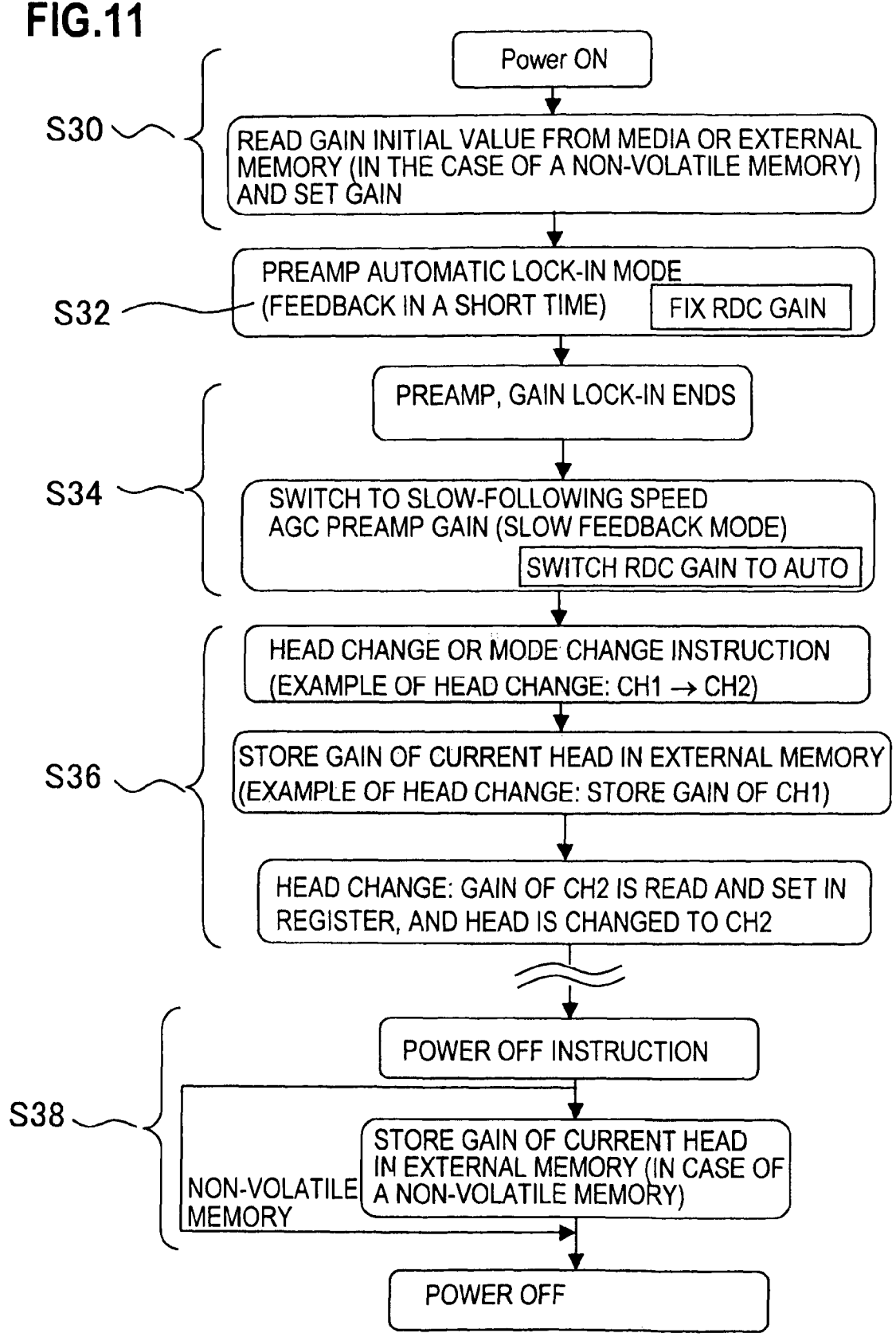
FIG. 11 is a processing flow of the AGC shown in FIG. 9.

FIG. 9 is a circuit diagram of a seventh embodiment of a read circuit of the invention, FIG. 10 shows the flow of the measurement and setting of the initial values in the configuration in FIG. 9, and FIG. 11 shows the flow of the AGC gain adjustment processing of the configuration in FIG. 9. In FIG. 9, portions which are the same as in FIG. 1, FIG. 2, FIG. 3, FIG. 4 and FIG. 5 are assigned the same symbols, only the AGC amplifier 10 of the head IC 103 and the head-switching circuit 40 and memory 28 are shown, and the read channel 102 is omitted. The configuration of the read channel 102 is the same as in FIG. 2.

As shown in FIG. 9, single AGC amplifier 10 handles the signals of a plurality of read elements (TuMR elements) 126-1a to 126-1n. The head-switching switch 40 switches the connection between the plurality of read elements 126-1a to 126-1n, and the differential amplifier 12, according to a channel (head) selection signal.

The AGC amplifier 10 has a differential amplifier 12 which is connected to this head-switching switch 40, and an AGC circuit 14 which automatically controls the gain of the differential amplifier 12. The AGC circuit 14 has a gain error detection circuit 16, a feedback controller (low-pass filter) 18, a gain multiplier 19, a switch 30 and an AGC sequencer 32.

The gain error detector 16 has a first A/D converter 20, which performs analog-digital conversion of the negative-side voltage of the differential amplifier 12; a second A/D converter 21, which performs analog-digital conversion of the positive-side voltage of the differential amplifier 12; a first computation unit 22, which takes the difference of the outputs from the A/D converters 20 and 21 and extracts the amplitude; a memory 24 which stores an amplitude target value (waveform); and a second computation unit 26, which computes the difference between the target value for the amplitude in the memory 24 and the detected amplitude from the first computation unit 22. This difference is the gain error.

The feedback controller 18 comprises a low-pass filter, which cuts out the high-frequency components in the gain error signal, forming a loop so as to track the low-frequency gain error signals. The gain multiplier 19 multiplies the output of the low-pass filter 18 by K, which is the feedback gain, determines the amplification factor, and controls the gain of the differential amplifier 12. If the value of this feedback gain K is small, the feedback response is slow, and if the feedback gain K is large, the feedback response is fast.

In this embodiment as well, the cut off frequency of the low-pass filter 18 in the AGC circuit 14 of the head IC 103 is set to be lower than the cut off frequency of the low-pass filter of the AGC circuit 107-2 in the read channel circuit 102 of FIG. 2, and moreover the feedback gain K of the gain multiplier 19 of the AGC circuit 14 of the head IC 103 is set to be smaller than the feedback gain of the gain multiplier of the AGC circuit 107-2 in the read channel circuit 102.

By this means, the feedback response speed of the AGC circuit 14 of the head IC 103 is set to be slower than the feedback response speed of the AGC circuit 107-2 of the read channel circuit 102.

Further more memory (RAM) 28, to store a gain initial value for each head, is provided in the MCU 104 of FIG. 1. On the other hand, a switch 30, a latch circuit 50 and an AGC sequencer 32 are provided in the head IC 103. At the time of mode switching (from a mode other than read mode to read mode, or channel selection change), the MPU 104b of the MCU 104 reads the gain initial values specified by the channel selection signals (head selection signals) from memory 28 before switching modes. The MPU 104b sets the read gain initial values in the latch circuit 50 of the head IC 103.

The AGC sequencer 32 operates the head-switching switch 40 by a channel selection signal from the MPU 104b, and connects the read element of the selected head to the differential amplifier 12.

Hence the gain initial value, which is set in the latch circuit 50, is set in the differential amplifier 12 via the switch 30. After the gain initial value is set in the differential amplifier 12, the AGC sequencer 32 switches the switch 30 to the AGC circuit 14 (that is, the gain multiplier 19).

The gain provided from the gain multiplier 19 to the differential amplifier 12 via the switch 30 is latched by the latch circuit 50. At the time of mode switching (from read mode to a mode other than read mode, or channel selection change), the MPU 104b reads the gain setting from the gain multiplier 19 latched by the latch circuit 50 before switching the mode, writes the value to memory 28, and updates the gain initial value of the corresponding channel.

Now gain measurement and storage processing before shipment from the factory is explained referring to FIG. 10.

(S20) The MPU 104b of the MCU 104 issues the head selection signal and the read mode. Since the gain initial value is unknown, the MPU 104b does not set the gain initial value in the latch circuit 50 of the head IC 103. The AGC sequencer 32 operates the head-switching switch 40 by a channel selection signal from the MPU 104b, connects the read element of the selected head to the differential amplifier 12, and connects the switch 30 to the gain multiplier 19.

(S22) The MPU 104b of the MCU 104 instructs the AGC sequencer 32 of the AGC amplifier 10 to set the automatic lock-in mode (feedback in a short time). At this time, the AGC circuit 107 of the read channel circuit 102 of FIG. 2 fixes the gain. By this, the AGC circuit 14 performs the lock-in operation.

(S24) When a prescribed time elapses, the AGC sequencer 32 judges that the gain lock-in has completed. At this time, the lock-in gain value has been latched by the latch circuit 50.

(S26) The MPU 104b reads the gain value latched by the latch circuit 50, and stores the value in an area corresponding to the head selection signal of memory 28. If memory 28 is not a non-volatile memory, the MPU 104b writes the read gain value in an area corresponding to the head selection signal in the system area of the disk 117 as control information. If memory 28 is a non-volatile memory, the writing to the disk is unnecessary. Then the MPU 104b judges whether the adjustment of the gain initial values of all the channels have completed. If not completed, [processing] returns to step S22, and a head, for which adjustment of the gain initial value has not been completed, is selected. If completed, the adjustment processing is ended.

AGC operation after shipment from the factory is explained referring to FIG. 11.

(S30) At the time of mode switching (from a mode other than read mode to read mode, or channel selection change) when power is turned ON, the MPU 104b of the MCU 104 reads the gain initial value specified by the channel selection signal (head selection signal) from memory 28 before switching the mode. The MPU 104b sets the read gain initial value in the latch circuit 50 of the head IC 103. If the gain initial value is stored in the system area of the disk medium 117, the gain initial values of all the heads are read from the system area of the disk medium 117, and stored in memory 28 only upon power ON. Then the gain initial value specified by the channel selection signal (head selection signal) is read from memory 28, and is set in the latch circuit 50.

(S32) The MPU 104b of the MCU 104 instructs the AGC sequencer 32 of the AGC amplifier 10 to set the automatic lock-in mode (feedback in a short time). At this time, the AGC circuit 107 of the read channel circuit 102 of FIG. 2 fixes the gain. By this, the AGC circuit 14 performs the lock-in operation.

That is, the AGC sequencer 32 generates the head-switching switch 40 by a channel selection signal from the MPU 104b, and connects the read element of the selected head to the differential amplifier 12. Hence the gain initial value, which is set in the latch circuit 50, is set in the differential amplifier 12 via the switch 30. After the gain initial value is set in the differential amplifier, the AGC sequencer 32 switches the switch 30 to the AGC circuit 14 (that is, the gain multiplier 19). Furthermore, the gain, provided from the gain multiplier 19 to the differential amplifier 12 via the switch 30, is latched by the latch circuit 50.

(S34) When a prescribed time elapses, the AGC sequencer 32 judges that the gain lock-in has completed. At this time, the lock-in gain value has been latched by the latch circuit 50. The MPU 104b instructs the AGC sequencer 32 to set the slow feedback mode, and switches the AGC 107 of the read channel 102 to the automatic gain mode. By this means, the AGC circuit 10 of the head IC 103 performs feedback at a flow-following speed, as mentioned above. The AGC 107 of the read channel 102, on the other hand, performs feedback at a fast-following speed. Hence the amplitude of the read signal from the head becomes constant.

(S36) At the time of mode switching (from read mode to a mode other than read mode, or channel selection change), the MPU 104b reads the gain setting from the gain multiplier 19 latched in the latch circuit 50, writes the value in memory 28, and updates the gain initial value of the corresponding channel. Then the operations in step S30 to step S34 are repeated.

(S38) Upon receiving the power OFF instruction, the MPU 104b writes the gain initial values of all the channels of memory 28 in the system area of the disk 117 if the gain initial values are stored in the system area of the disk medium 117. If the memory 28 is a non-volatile memory, this writing operation is not required. Then power is turned OFF.

In this example as well, in order to prevent contention, the feedback response speed of the AGC circuit 14 of the head IC 103 is slowed, so that upon startup and during mode switching the lock-in time is long. In order to prevent this, a gain initial value is stored, and upon startup and during mode-switching, the gain initial value is set in the differential amplifier 12. Hence even when the feedback response speed of the AGC circuit 14 is slow, the lock-in time can be shortened.

In addition, gain initial values are stored according to scattering in the characteristics of each head (read element), and upon head selection, at startup or during mode switching, the gain initial values are set in the differential amplifier 12. Furthermore, the gain initial values are updated to the actual values immediately before switching, and the optimum gain initial values are always stored. Hence even when the feedback response speed of the AGC circuit 14 is slow, the lock-in time can be shortened regardless the characteristics of individual heads. In addition, the changes in lead-in time due to the characteristics of a head and temperature change can also be prevented.

Moreover, memory to store the initial values need not be provided in the head IC 103, so the chip area of the head IC 103 can be decreased.

Eighth Embodiment of a Read Circuit

Figure 12:
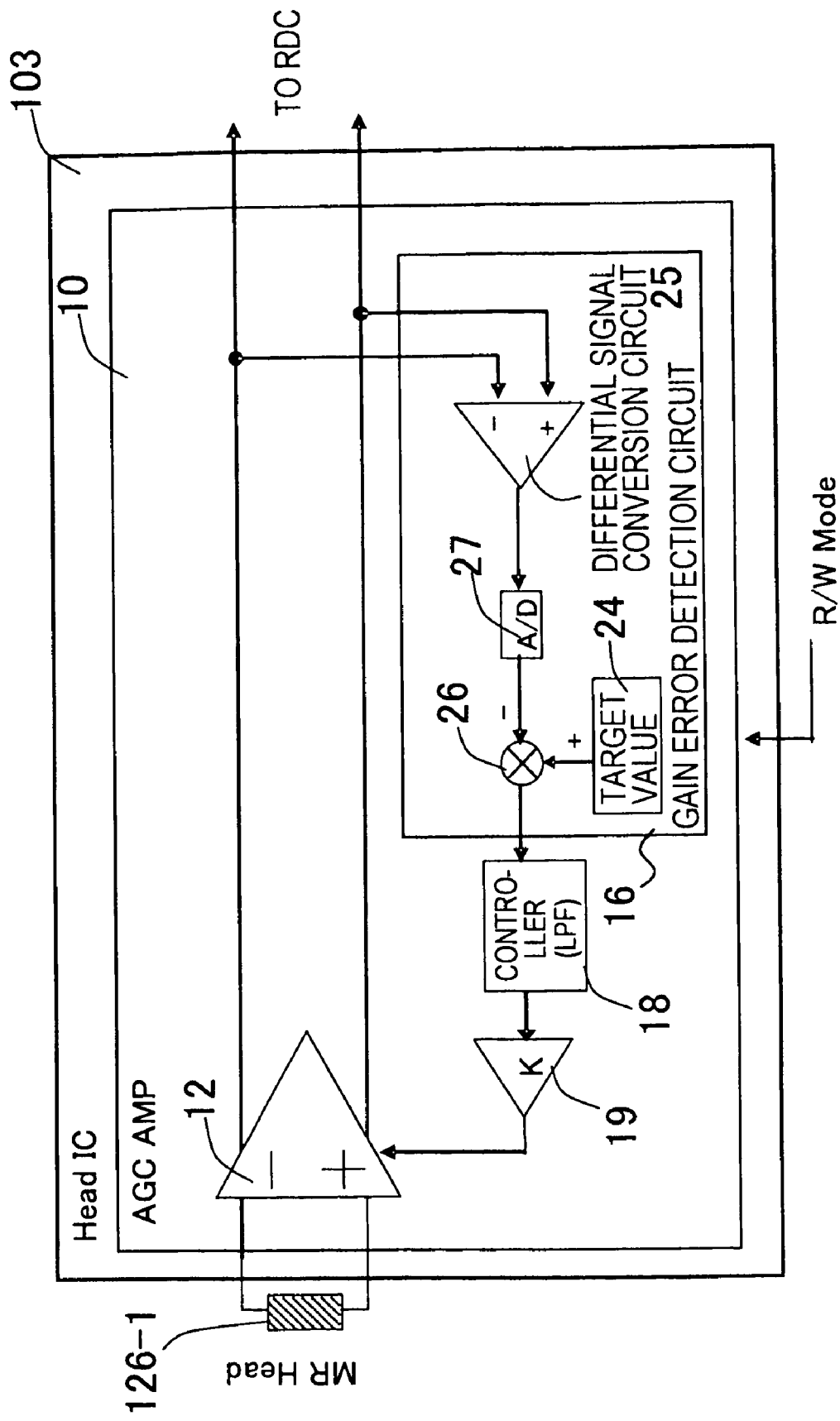
FIG. 12 is a circuit diagram of an eighth embodiment of a read circuit of the invention.

FIG. 12 is a block diagram of a head IC of the eighth embodiment of the invention, and shows only the AGC circuit 10 of the head IC 103. In FIG. 12, portions which are the same as in FIG. 2 to FIG. 7 are assigned the same symbols.

This embodiment has the configuration of FIG. 2, where the number of A/D converters can be reduced to one. That is, the AGC amplifier 10 comprises a differential amplifier 12 connected across both terminals of the read element (TuMR element) 126-1, and an AGC circuit 14 which automatically controls the gain of the differential amplifier 12. The AGC circuit 14 has a gain error detection circuit 16, a feedback controller (low-pass filter) 18 and a gain multiplier 19.

The gain error detector 16 has a differential signal conversion circuit (differential amplifier) 25, which takes the difference between the negative-side voltage and the positive-side voltage of the differential amplifier 12, a third A/D converter 27, which performs analog-digital conversion of the output of the differential signal conversion circuit 25, memory 24, which stores the amplitude target value (waveform), and a second computation unit 26, which computes the difference between the amplitude target value in memory 24 and the detected amplitude from the A/D converter 27. This difference is the gain error.

The feedback controller 18 comprises a low-pass filter, which cuts out the high frequency components in the gain error signal, forming a loop so as to track low-frequency gain error signals. The gain multiplier 19 multiplies the output of the low-pass filter 18 by K, which is the feedback gain, determines the amplification factor, and controls the gain of the differential amplifier 12. If the value of this feedback gain K is small, the feedback response is slow, and if the feedback gain K is large, the feedback response is fast.

In this example, the number of A/D converters can be reduced to one, hence the circuit scale of the head IC can be smaller, which is effective to decrease the chip area. This AGC circuit having one A/D converter can be applied not only to the embodiment of FIG. 2, but also to the embodiments of FIG. 3 to FIG. 7, and FIG. 9.

The cut off frequency of the low-pass filter 18 in the AGC circuit 14 of this head IC 103 is set to be lower than the cut off frequency of the low-pass filter of the AGC circuit 107-2 in the read channel circuit 102, and moreover the feedback gain K of the gain multiplier 19 of the AGC circuit 14 of the head IC 103 is set to be smaller than the feedback gain of the gain multiplier of the AGC circuit 107-2 in the read channel circuit 102.

Ninth Embodiments of a Read Circuit

Figure 13:
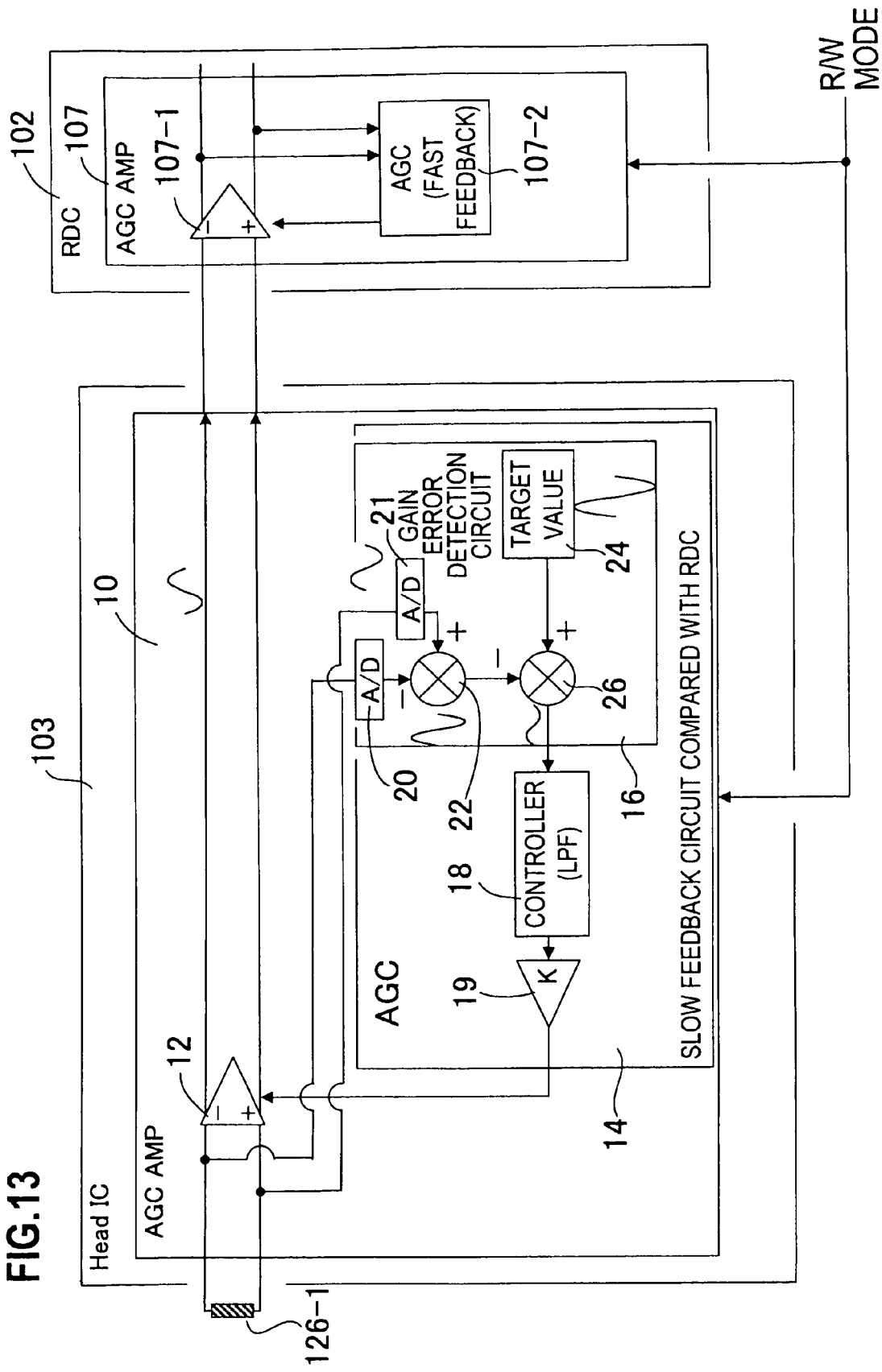
FIG. 13 is a circuit diagram of a ninth embodiment of a read circuit of the invention.

FIG. 13 is a block diagram of a read circuit of a ninth embodiment of the invention. In FIG. 13, portions which are the same as in FIG. 2 to FIG. 7 are assigned the same symbols. In this example, the AGC circuit is a feed forward type.

In other words, just like the case of FIG. 2, the AGC amplifier 10 comprises a differential amplifier 12 connected across both terminals of the read element (TuMR element) 126-1, and an AGC circuit 14 which automatically controls the gain of the differential amplifier 12. The AGC circuit 14 has a gain error detection circuit 16, a feedback controller (low-pass filter) 18 and a gain multiplier 19.

The gain error detector 16 has a first A/D converter 20, which performs analog-digital conversion of the negative-side voltage of the differential amplifier 12; a second A/D converter 21, which performs analog-digital conversion of the positive-side voltage at the input side of the differential amplifier 12; a first computation unit 22, which takes the difference of the outputs from the A/D converters 20 and 21 and extracts the amplitude; memory 24, which stores an amplitude target value (waveform); and a second computation unit 26, which computes the difference between the target value for the amplitude in memory 24 and the detected amplitude from the first computation unit 22. This difference is the gain error.

The feedback controller 18 comprises a low-pass filter, which cuts out the high-frequency components in the gain error signal, forming a loop so as to track the low-frequency gain error signals. The gain multiplier 19 multiplies the output from the low-pass filter 18 by K, which is the feedback gain, determines the amplification factor, and controls the gain of the differential amplifier 12. If the value of this feedback gain K is small, the feedback response is slow, and if the feedback gain K is large, the feedback response is fast.

In the read channel circuit 102, an AGC amplifier 107, comprising a differential amplifier 107-1 and an AGC circuit 107-2, is provided. The configuration of the AGC circuit 107-2 is the same as the AGC circuit 14 of the head IC 103, so explanation is omitted.

The cut off frequency of the low-pass filter 18 in the AGC circuit 14 of the head IC 103 is set to a frequency lower than the cut off frequency of the low-pass filter in the AGC circuit 107-2 of the read channel circuit 102, and the feedback gain K of the gain multiplier 19 in the AGC circuit 14 of the head IC 103 is set to be smaller than the feedback gain of the gain multiplier in the AGC circuit 107-2 of the read channel circuit 102.

By this means, the feedback response speed of the AGC circuit 14 of the head IC 103 is set to be slower than the feedback response speed of the AGC circuit 107-2 of the read channel circuit 102.

Furthermore, the AGC circuit is a feed forward type, which monitors the input side voltage of the differential amplifier 12, and automatically controls the gain of the differential amplifier 12, so the signals to be monitored are not influenced by signals from a circuit in a subsequent stage (read channel 102 in this case). Hence AGC can be performed without the influence of noise even if monitor amplitude is small.

This feed forward type AGC circuit can be applied not only to the embodiment of FIG. 2, but also to the embodiments of FIG. 3 to FIG. 7, FIG. 9 and FIG. 12.

Other Embodiments

In the above-described embodiments, AGC circuits with the configuration shown in FIG. 2 or similar have been explained; but application to analog AGC circuits, to AGC circuits having peak-hold circuits and integrating circuits, and to other AGC circuits is also possible. Further, examples of the read circuits of heads in magnetic disk devices were explained, but application to the read circuits of other media storage devices is also possible.

In the above, embodiments of the invention have been explained; however, various modifications can be made within the scope of the invention, and such modifications are not excluded from the scope of the invention.

An AGC amplifier is provided in the head IC, so that the amplitude from the head is automatically adjusted within the head IC, and consequently signal levels can be adjusted to within the input dynamic range of the AGC amplifier of the read channel.

There is the danger of an oscillation state due to AGC contention when two AGC circuits operate simultaneously, so that AGC pull-in may take an excessive amount of time. But by causing the AGC circuit of the read channel circuit to have a comparatively fast feedback response, while on the other hand setting the feedback response of the AGC circuit in the head IC to be slower than the feedback response of the AGC circuit in the read channel, the AGC circuit in the head IC can be prevented from affecting the faster AGC operation of the AGC circuit in the read channel.

Further, because automatic level adjustment is performed within the head IC, there is no need for extra signal lines with external equipment. Consequently the head IC can more easily be mounted on the actuator.

What is claimed is:

1. A head IC for adjusting an amplitude level of a read signal from a head and outputting the adjusted level to a read channel having an AGC amplifier, comprising:
a differential amplifier, which amplifies the read signal at a preset gain; and
an AGC circuit, which obtains a difference between an input or an output amplitude level of the differential amplifier and a reference level, and automatically controls a gain of the differential amplifier according to a prescribed pull-in characteristic,
wherein said output of said differential amplifier is input to said AGC amplifier in the read channel.

2. The head IC according to claim 1, wherein a pull-in characteristic of the AGC circuit is set to be slower than the pull-in characteristic of the AGC amplifier of the read channel.

3. The head IC according to claim 1, further comprising a sequencer circuit which sets the differential amplifier to the initial value of the gain stored in a memory at the time of initiation of pull-in of the AGC circuit.

4. The head IC according to claim 3, wherein the sequencer circuit updates the initial value of the gain in the memory with the gain set in the differential amplifier of the AGC circuit, in response to the end of reading by the head.

5. The head IC according to claim 2, further comprising a sequencer circuit which sets the pull-in characteristic of the AGC circuit to be fast at the time of startup of the AGC circuit, and instructs that the gain of the AGC amplifier of the read channel be fixed, and in response to the end of pull-in of the AGC circuit, sets the pull-in characteristic of the AGC circuit to be slower than the pull-in characteristic of the AGC amplifier of the read channel.

6. The head IC according to claim 3, further comprising a detection circuit which estimates the output level according to a resistance value of the head, calculates the initial value, and writes the initial value to the memory.

7. The head IC according to claim 1, wherein said AGC circuit comprises:
a gain error computation portion which computes the difference between the input or output amplitude level of the differential amplifier and a reference level;
a low-pass filter which cuts off high-frequency components in the difference output; and
a gain multiplier which multiplies the output of the low-pass filter by a prescribed feedback gain, to control the gain of the differential amplifier.

8. The head IC according to claim 3, further comprising a head switching portion to connect the differential amplifier to any one of a plurality of heads according to a head switching signal,
wherein the memory stores the gain initial values of the plurality of heads, and the sequencer circuit sets the gain initial value corresponding to the connected head in the memory to the differential amplifier at the time of initiation of pull-in of the AGC circuit.

9. A read circuit for adjusting amplitude levels of a read signal from a head, comprising:
a head IC which adjusts the amplitude level of read signal from the head; and
read channel, which has an AGC amplifier, connected to the head IC,
wherein the head IC comprises:
a differential amplifier which amplifies the read signal with a preset gain; and
an AGC circuit which obtains a difference between an input or an output amplitude level of the differential amplifier and a reference level and automatically controls the gain of the differential amplifier according to a prescribed pull-in characteristic,
and wherein said output of said differential amplifier is input to said AGC amplifier in the read channel.

10. The read circuit according to claim 9, wherein a pull-in characteristic of the AGC circuit is set to be slower than a pull-in characteristic of the AGC amplifier of the read channel.

11. The read circuit according to claim 9, wherein the head IC further comprises:
a memory for storing an initial value for the gain; and
a sequencer circuit for setting the differential amplifier to the initial value of the gain in the memory at the time of initiation of pull-in of the AGC circuit.

12. The read circuit according to claim 11, wherein the sequencer circuit updates the initial value of the gain in the memory with the gain set in the differential amplifier of the AGC circuit, in response to the end of reading by the head.

13. The read circuit according to claim 9, further comprising a sequencer circuit which sets the pull-in characteristic of the AGC circuit to be fast at the time of startup of the AGC circuit, and instructs that the gain of the AGC amplifier of the read channel be fixed, and in response to the end of pull-in of the AGC circuit, sets the pull-in characteristic of the AGC circuit to be slower than the pull-in characteristic of the AGC amplifier of the read channel.

14. The read circuit according to claim 10, further comprising a detection circuit which estimates the output level according to the resistance value of the head, calculates the initial value, and writes the initial value to the memory.

15. The read circuit according to claim 9, wherein the AGC circuit of the head IC comprises:
   a gain error computation portion which computes the difference between the input or the output amplitude level of the differential amplifier and the reference level;
   a low-pass filter which cuts off high-frequency components in the difference output; and
   a gain multiplier which multiplies the output of the low-pass filter by a prescribed feedback gain, to control the gain of the differential amplifier.

16. The read circuit according to claim 11, further comprising a head switching portion to connect the differential amplifier to any one of a plurality of heads according to a head switching signal,
   wherein the memory stores the gain initial values of the plurality of heads, and the sequencer circuit sets the gain initial value corresponding to the connected head in the memory to the differential amplifier at the time of initiation of pull-in of the AGC circuit.

17. A media storage device, comprising:
   a head which reads data on media;
   a head IC which adjusts an amplitude level of a read signal from the head; and
   a read channel, connected to the head IC, and having an AGC amplifier,
   wherein the head IC comprises:
   a differential amplifier which amplifies the read signal with a preset gain; and
   an AGC circuit which obtains a difference between an input or an output amplitude level of the differential amplifier and a reference level, and automatically controls the gain of the differential amplifier according to a prescribed pull-in characteristic,
   and wherein said output of said differential amplifier is input to said AGC amplifier in the read channel.

18. The media storage device according to claim 17, wherein a pull-in characteristic of the AGC circuit is set to be slower than a pull-in characteristic of the AGC amplifier of the read channel.

19. The media storage device according to claim 17, wherein the head IC further comprises:
   a memory for storing an initial value for the gain; and
   a sequencer circuit for setting the differential amplifier to the initial value of the gain in the memory at the time of initiation of pull-in of the AGC circuit.

20. The media storage device according to claim 19, wherein the sequencer circuit updates the initial value of the gain in the memory with the gain set in the differential amplifier of the AGC circuit, in response to the end of reading by the head.

21. The media storage device according to claim 18, further comprising a sequencer circuit which sets the pull-in characteristic of the AGC circuit to be fast at the time of startup of the AGC circuit, and instructs that the gain of the AGC amplifier of the read channel be fixed, and in response to the end of pull-in of the AGC circuit, sets the pull-in characteristic of the AGC circuit to be slower than the pull-in characteristic of the AGC amplifier of the read channel.

22. The media storage device according to claim 17, further comprising a detection circuit which estimates the output level according to the resistance value of the head, calculates the initial value, and writes the initial value to the memory.

23. The media storage device according to claim 19, further comprising a head switching portion to connect the differential amplifier to any one of a plurality of heads according to a head switching signal,
   wherein the memory stores the gain initial values of the plurality of heads, and the sequencer circuit sets the gain initial value corresponding to the connected head in the memory to the differential amplifier at the time of initiation of pull-in of the AGC circuit.

* * * * *